US011983981B2

(12) United States Patent
Rosander et al.

(10) Patent No.: US 11,983,981 B2
(45) **Date of Patent: *May 14, 2024**

(54) ELECTRONIC GAMING MACHINE HAVING A REEL ASSEMBLY WITH A SUPPLEMENTAL IMAGE DISPLAY

(71) Applicant: IGT, Las Vegas, NV (US)

(72) Inventors: Tai Rosander, Reno, NV (US); Allan C. Snippen, Reno, NV (US)

(73) Assignee: IGT, Las Vegas, NV (US)

( * ) Notice: Subject to any disclaimer, the term of this patent is extended or adjusted under 35 U.S.C. 154(b) by 499 days.

This patent is subject to a terminal disclaimer.

(21) Appl. No.: 17/331,487

(22) Filed: May 26, 2021

(65) Prior Publication Data

US 2021/0287483 A1 Sep. 16, 2021

Related U.S. Application Data

(63) Continuation of application No. 16/196,652, filed on Nov. 20, 2018, now Pat. No. 11,030,847, which is a continuation-in-part of application No. 16/131,483, filed on Sep. 14, 2018, now Pat. No. 10,593,148.

(51) Int. Cl.

| | |
|---|---|
| ***G07F 17/00*** | (2006.01) |
| ***G07F 17/32*** | (2006.01) |
| ***G07F 17/34*** | (2006.01) |

(52) U.S. Cl.

CPC ...... *G07F 17/3213* (2013.01); *G07F 17/3209* (2013.01); *G07F 17/3246* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 3,642,287 | A | 2/1972 | Lally et al. |
| 4,410,178 | A | 10/1983 | Partridge |
| 6,517,433 | B2 | 2/2003 | Loose et al. |
| 7,311,607 | B2 | 12/2007 | Tedsen et al. |
| 7,380,791 | B2 | 6/2008 | Gauselmann et al. |
| 7,708,640 | B2 | 5/2010 | Burak et al. |
| 8,651,939 | B2 | 2/2014 | Nordman |
| 8,727,855 | B2 | 5/2014 | Williams et al. |
| 8,814,654 | B2 | 8/2014 | Hoffman et al. |
| 9,396,617 | B2 | 7/2016 | Kitamura et al. |
| 9,904,375 | B1 | 2/2018 | Donnelly et al. |
| 2002/0005826 | A1 | 1/2002 | Pederson |
| 2003/0193802 | A1 | 10/2003 | Luk |
| 2004/0132522 | A1 | 7/2004 | Seelig et al. |
| 2004/0192430 | A1 | 9/2004 | Burak et al. |
| 2005/0153775 | A1 | 7/2005 | Griswold et al. |
| 2007/0202947 | A1 | 8/2007 | Seelig et al. |
| 2009/0227357 | A1 | 9/2009 | Rasmussen |
| 2010/0041460 | A1 | 2/2010 | Stewart et al. |
| 2010/0048280 | A1 | 2/2010 | Kearns et al. |
| 2010/0099483 | A1 | 4/2010 | Bleich et al. |

FOREIGN PATENT DOCUMENTS

EP 1492063 A2 12/2004

*Primary Examiner* — James S. McClellan
*Assistant Examiner* — Jeffrey K Wong
(74) *Attorney, Agent, or Firm* — Neal, Gerber & Eisenberg LLP

(57) ABSTRACT

A gaming system including a housing and a reel assembly supported by the housing, the reel assembly including a frame, a plurality of individually rotatable reels supported by the frame, and one or more supplemental image displays supported by the frame and associated with the rotatable reels.

17 Claims, 20 Drawing Sheets

ELECTRONIC GAMING MACHINE HAVING A REEL ASSEMBLY WITH A SUPPLEMENTAL IMAGE DISPLAY

PRIORITY CLAIM

This application is a continuation of, claims priority to, and the benefit of U.S. patent application Ser. No. 16/196,652, filed Nov. 20, 2018, continuation-in-part of, claims priority to, and the benefit of U.S. patent application Ser. No. 16/131,483, filed Sep. 14, 2018, the entire contents of which are incorporated herein by reference.

BACKGROUND

The present disclosure relates to gaming machines, and more particularly gaming machines that include mechanical reels. Gaming machines also may include lights associated with the mechanical reels. Gaming machines may include back lights positioned within the mechanical reels to illuminate the mechanical reels. Gaming machines may also include one or more secondary displays that display images above, below, or to one or more sides of the reels.

BRIEF SUMMARY

Various embodiments of the present disclosure are directed to gaming systems, and particularly electronic gaming machines including a housing and a reel assembly positioned in and supported by the housing. In various embodiments, the reel assembly includes a frame and a plurality of rotatable reels supported by the frame, wherein one or more supplemental image displays are associated with one or more of the rotatable reels, and configured to display one or more player perceivable images in association with one or more of the rotatable reels. In various such embodiments, the supplemental image displays are integrated into the rotatable reels and configured to display one or more player perceivable images in association with the rotatable reels.

Various embodiments of the present disclosure provide a gaming system including a housing; a reel assembly supported by the housing, the reel assembly including a rotatable reel comprising a first light arm, the first light arm including a plurality of selectively illuminable first lights; a processor; and a memory device that stores a plurality of instructions, which when executed by the processor, cause the processor to: cause the reel to rotate such that the first light arm rotates in a first orbit associated with the reel, and selectively cause the first lights to illuminate while the reel and the first light arm rotate such that the first lights cause a player perceivable image to be displayed in association with the reel.

Various embodiments of the present disclosure provide a gaming system including a housing; a reel assembly supported by the housing, the reel assembly including: a rotatable first reel comprising a first light arm, the first light arm including a plurality of selectively illuminable first lights, the first light arm connecting spaced apart rims of the first reel; and a rotatable second reel comprising a second light arm, the second light arm including a plurality of selectively illuminable second lights, the second light arm connecting spaced apart rims of the second reel; a processor; and a memory device that stores a plurality of instructions. When executed by the processor, the plurality of instructions cause the processor to: cause the first reel to rotate such that the first light arm rotates in a first orbit associated with the first reel, and cause the second reel to rotate such that the second light arm rotates in a second orbit associated with the second reel; and selectively cause the first lights and the second lights to illuminate while the first light arm rotates in the first orbit and the second light arm rotates in the second orbit such that the first lights and the second lights cause a player perceivable image to be displayed.

Various embodiments of the present disclosure provide gaming system including a housing; a reel assembly supported by the housing, the reel assembly including: a rotatable reel supported by the frame, and a supplemental image display comprising a plurality of light arms integrated into the reel, the plurality of light arms each including a plurality of selectively illuminable lights; a processor; and a memory device that stores a plurality of instructions. When executed by the processor, the plurality of instructions cause the processor to operate with the supplemental image display to: cause each of the light arms of the supplemental image display to rotate in an orbit relative to the reel, and selectively cause the lights to illuminate while the light arms rotate in the orbit to cause a player perceivable image to be displayed relative to the reel.

Additional features are described herein, and will be apparent from, the following Detailed Description and the Figures.

BRIEF DESCRIPTION OF SEVERAL OF THE DRAWING

Figure 17:
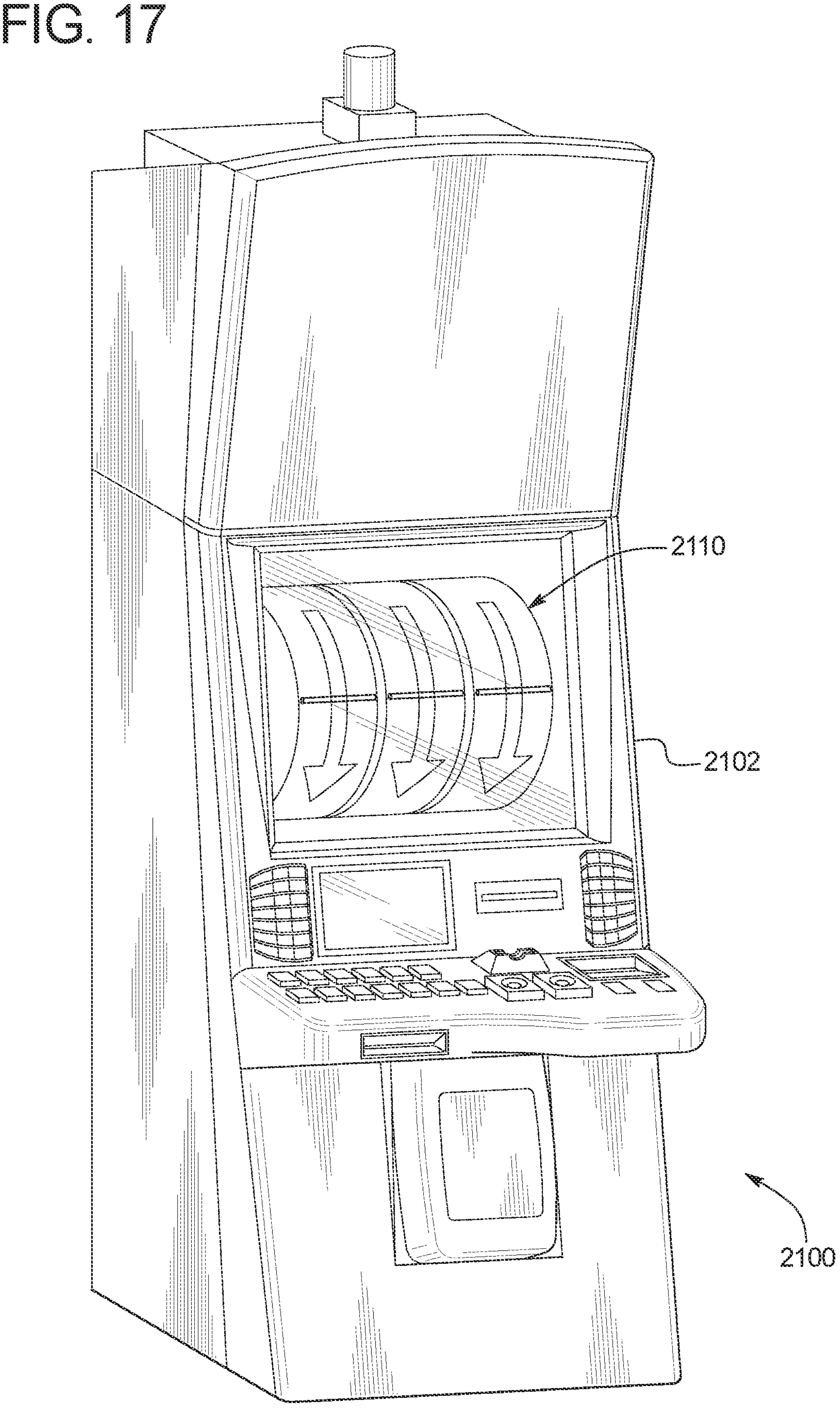
FIG. 17 is a diagrammatic perspective view of an electronic gaming machine of another example embodiment of the present disclosure and having a reel assembly including a plurality of rotatable reels and supplemental image displays integrated into the plurality of rotatable reels.
Figure 20:
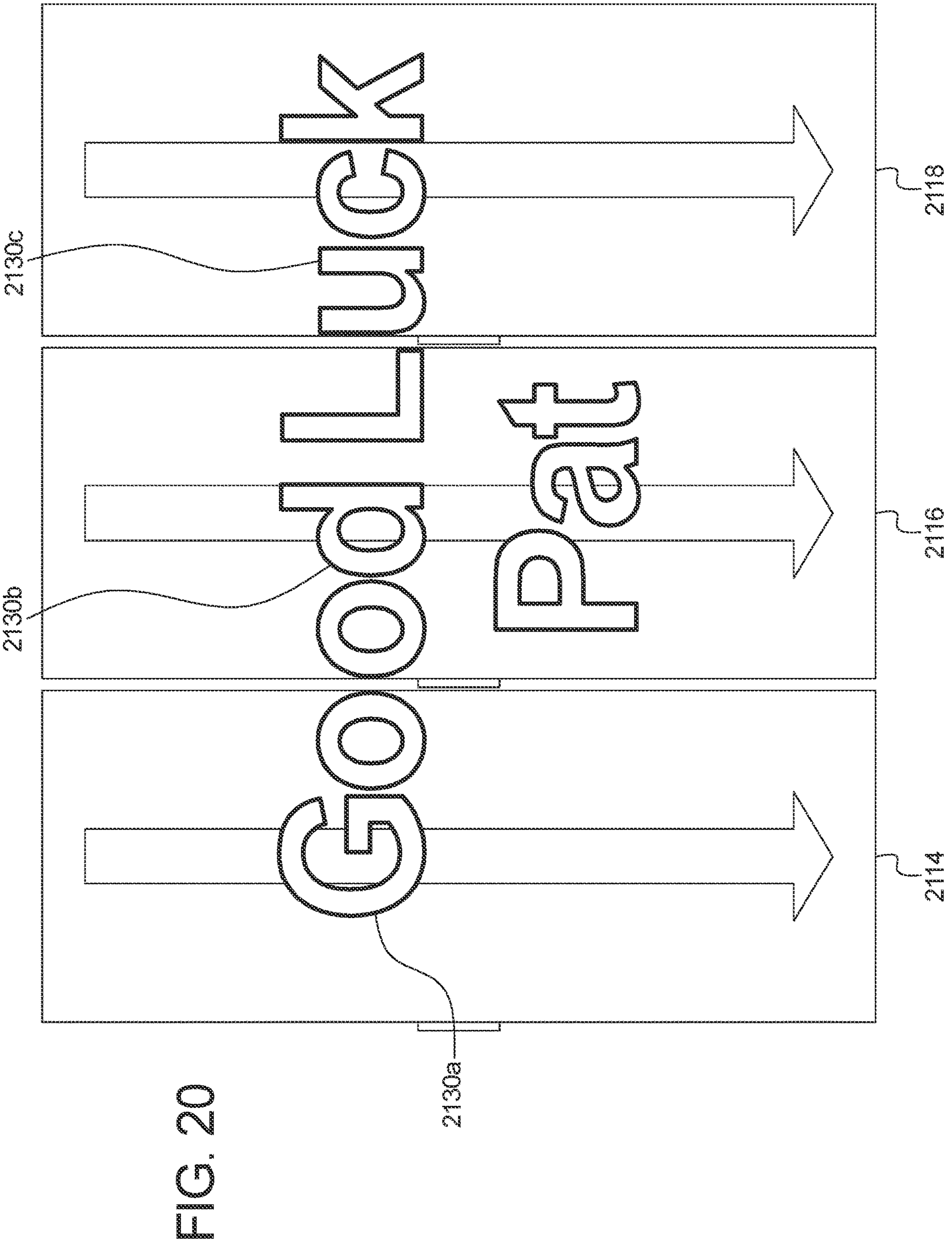

FIG. 20 is an enlarged diagrammatic front view of the reel assembly of the electronic gaming machine of FIG. 17, shown removed from the housing of the electronic gaming machine, and generally showing the rotatable reels rotating and the supplemental image displays that are integrated into the rotatable reels rotating with the rotatable reels and displaying a combined player perceivable image including a combination of example letters.

DETAILED DESCRIPTION

Various embodiments of the present disclosure are directed to gaming systems and particularly to electronic gaming machines ("EGMs") including a housing and a reel assembly supported by the housing. For brevity and clarity, and unless specifically stated otherwise, the term "EGM" is used herein to refer to an electronic gaming machine (such as but not limited to a slot machine).

In various example embodiments, the reel assembly includes a frame, a plurality of rotatable reels supported by the frame, and one or more supplemental image displays supported by the frame and associated with the rotatable reels. In various example embodiments, the reel assembly includes a plurality of supplemental image displays each associated with a different one of the rotatable reels, each of the supplemental image displays including: (1) a supporting arm coupled to and supported by the frame; (2) one or more of light arms attached to the supporting arm and concentrically positioned relative to one of the rotatable reels and extending transversely to and exterior to a cylindrical outer surface of that rotatable reel, each light arm including a plurality of selectively and individually illuminable lights; and (3) a supporting arm actuator that is configured to rotate the supporting arm and cause the light arm(s) to rotate concentrically around or in an orbit around that rotatable reel. In various other example embodiments, the reel assembly includes a single supplemental image display associated with a plurality of the rotatable reels and including: (1) a supporting arm coupled to and supported by the frame; (2) one or more of light arms attached to the supporting arm and concentrically positioned relative to the plurality of the rotatable reels and extending transversely to and exterior to cylindrical outer surfaces of those rotatable reels, each light arm including a plurality of selectively and individually illuminable lights; and (3) a supporting arm actuator that is configured to rotate the supporting arm and cause the light arm(s) to rotate concentrically around or in an orbit around the plurality of the rotatable reels.

In various embodiments, each of the supplemental images displays functions as or like what is sometimes referred to as a persistence-of-vision ("POV") display. A POV display is considered to trick the human brain because the human brain retains a first image for a fraction of a second longer than the human eye actually sees the first image. The eye actually sees a second next image by the time the brain loses its retention of the first image. Since the human brain retains the first image the eye just saw, the human brain does not perceive a gap (or flicker) between the first image and the second image. A POV display take advantages of this to display desired generally uninterrupted player perceivable images to a person using a plurality of spaced apart rotating lights. To display the perceivable image, the rotation of the lights is relatively fast. For example, in various embodiments, the rotation of the lights will be at least 60 rotations per minute.

As further explained below, each of the supplemental image displays function in this manner, and the EGM selectively turns on and off the individual selectively illuminable lights of the lights arms as the light arms are rapidly spinning concentrically to or in orbits around the rotatable reels. This creates a POV type effect such that images can be perceived by a person to appear exterior to and in front of the respective rotatable reel or reels. The supplemental image display thus employs a rapidly rotated structure on which the selectively illuminable lights (such as LEDs) are mounted and are selectively illuminated to create this POV effect relative to one or more of the rotatable reels. This can be done when the rotatable reels are stationary or spinning in accordance with the present disclosure.

Referring now to FIGS. 1, 2, 3, 4, 5, 6, 7, and 8, one example embodiment of an EGM of the present disclosure is illustrated and generally indicated by numeral 100. This example EGM 100 includes a suitable housing 102 that supports numerous components of the EGM 100. It should be appreciated that only certain of these components are illustrated and described herein, and that one of ordinary skill in the art would understand the various components not illustrated or described herein.

The housing 102 defines an interior compartment (not labeled). The EGM 100 includes a reel assembly 110 at least partially positioned in and supported by the housing 102. Generally, in this illustrated example embodiment, the reel assembly 110 includes: (1) a suitable frame (not shown); (2) a plurality of individual rotatable reels such as rotatable reels 114, 116, and 118 suitably supported by the frame; (3) a plurality of suitable reel actuators (not shown) suitably respectively coupled to the rotatable reels 114, 116, and 118 and configured to respectively rotate the reels 114, 116 and 118; (4) a plurality of supplemental image displays such as supplemental image displays 130, 150, and 170 suitably supported by the frame and positioned partially adjacent to the respective sides of the rotatable reels 114, 116, and 118 and partially exterior to the rotatable reels 114, 116, and 118; and (5) a plurality of suitable supplemental image display actuators (not shown) suitably respectively coupled to the supplemental image displays 130, 150, and 170. Each of these rotatable reels 114, 116, and 118 includes a respective reel strip (not labeled) that includes a plurality of different symbols (not labeled) thereon in a conventional manner. It should be appreciated that the reel assembly 110 (in this example embodiment and various other example embodiments described herein) is positioned in the housing 102 behind a see through plastic or glass panel not shown in a conventional manner to prevent access to the reel assembly 110.

In this illustrated example embodiment, supplemental image display 130 includes: (1) a central hub 132 suitably connected by an axle 133 to a suitable supplemental image display actuator (not shown) configured to rotate the axle 133 and thus the entire the supplemental image display 130; (2) a first extension arm 134 suitably connected to (such as by connection pin 134*a*) and extending outwardly from the central hub 132; (3) a second extension arm 135 suitably connected to (such as by connection pin 135*a*) and extending outwardly from the central hub 132; (4) a first light arm 136 suitably connected to (such as by connection pin 136*a*) and extending transversely from the first extension arm 134; and (5) a second light arm 137 suitably connected to (such as by connection pin 137*a*) and extending transversely from the second extension arm 135. In this illustrated example embodiment, the first light arm 136 includes a plurality of selectively and individually illuminable lights 138*a* to 138*i* connected to, supported by, and positioned on a front outwardly facing side of the first light arm 136 (opposite the side of the light arm 136 that faces the rotatable reel 114). Likewise, in this illustrated example embodiment, the second light arm 137 includes a plurality of selectively and individually illuminable lights (not shown) connected to, supported by, and positioned on a front outwardly facing side of the second light arm 137 (opposite the side of the light arm 137 that faces the rotatable reel 114). Although not shown, the lights are suitably connected to a suitable electric power source. For example, the electric power for or to the individually illuminable lights can be provided by one or more wireless induction mechanisms, one or more batteries, and/or by one or more slip ring mechanisms.

Likewise, in this illustrated example embodiment, supplemental image display 150 includes: (1) a central hub (not shown) suitably connected by an axle (not shown) to a suitable supplemental image display actuator (not shown) configured to rotate the axle and thus the entire the supplemental image display 150; (2) a first extension arm 154 suitably connected to (such as by a connection pin (not shown)) and extending outwardly from the central hub; (3) a second extension arm 155 suitably connected to (such as by connection pin (not shown)) and extending outwardly from the central hub; (4) a first light arm 156 suitably connected to (such as by connection pin (not shown)) and extending transversely from the first extension arm 154; and (5) a second light arm 157 suitably connected to (such as by connection pin (not shown)) and extending transversely from the second extension arm 155. In this illustrated example embodiment, the first light arm 156 includes a plurality of selectively and individually illuminable lights 158*a* to 158*i* connected to, supported by, and positioned on a front outwardly facing side of the first light arm (opposite the side of the light arm that faces the rotatable reel 116). Likewise, in this illustrated example embodiment, the second light arm 157 includes a plurality of selectively and individually illuminable lights (not shown) connected to, supported by, and positioned on a front outwardly facing side of the second light arm 157 (opposite the side of the light arm 157 that faces the rotatable reel 116). Although not shown, the lights are suitably connected to a suitable electric power source. For example, the electric power for or to the individually illuminable lights can be provided by one or more wireless induction mechanisms, one or more batteries, and/or by one or more slip ring mechanisms.

Likewise, in this illustrated example embodiment, supplemental image display 170 includes: (1) a central hub (not shown) suitably connected by an axle (not shown) to a suitable supplemental image display actuator (not shown) configured to rotate the axle and thus the entire the supplemental image display 170; (2) a first extension arm 174 suitably connected to (such as by a connection pin (not shown)) and extending outwardly from the central hub; (3) a second extension arm 175 suitably connected to (such as by connection pin (not shown)) and extending outwardly from the central hub; (4) a first light arm 176 suitably connected to (such as by connection pin (not shown)) and extending transversely from the first extension arm 174; and (5) a second light arm 177 suitably connected to (such as by connection pin (not shown)) and extending transversely from the second extension arm 175. In this illustrated example embodiment, the first light arm 176 includes a plurality of selectively and individually illuminable lights

178*a* to 178*i* connected to, supported by, and positioned on a front outwardly facing side of the first light arm (opposite the side of the light arm that faces the rotatable reel 118). Likewise, in this illustrated example embodiment, the second light arm 177 includes a plurality of selectively and individually illuminable lights (not shown) connected to, supported by, and positioned on a front outwardly facing side of the second light arm 177 (opposite the side of the light arm 177 that faces the rotatable reel 118). Although not shown, the lights are suitably connected to a suitable electric power source. For example, the electric power for or to the individually illuminable lights can be provided by one or more wireless induction mechanisms, one or more batteries, and/or by one or more slip ring mechanisms.

Thus, in this illustrated example embodiment: (1) the first extension arm 134 of the supplemental image display 130 is positioned adjacent to a first side of reel 114; (2) the second extension arm 135 of the supplemental image display 130 is positioned adjacent to the first side of reel 114; (3) the first extension arm 154 of the supplemental image display 150 is positioned adjacent to a first side of reel 116 (i.e., between reel 114 and reel 116); (4) the second extension arm 155 of the supplemental image display 150 is positioned adjacent to the first side of reel 116 (i.e., between reel 114 and reel 116); (5) first extension arm 174 of the supplemental image display 170 is positioned adjacent to a first side of reel 118 (i.e., between reel 116 and reel 118); and (6) the second extension arm 175 of the supplemental image display 170 is positioned adjacent to a first side of reel 118 (i.e., between reel 116 and reel 118).

Additionally, in this illustrated example embodiment: (1) the first light arm 136 of the supplemental image display 130 is positioned spaced apart from a cylindrical outer surface of reel 114 such that it can rotate in a first orbit concentrically about and spaced from the cylindrical outer surface of reel 114; (2) the second light arm 137 of the supplemental image display 130 is positioned such that it can rotate in the same first orbit concentrically about and spaced from the cylindrical outer surface of reel 114; (3) the first light arm 156 of the supplemental image display 150 is positioned such that it can rotate in a second orbit concentrically about and spaced from the cylindrical outer surface of reel 116; (4) the second light arm 157 of the supplemental image display 150 is positioned such that it can rotate in a same second orbit concentrically about and spaced from the cylindrical outer surface of reel 116; (5) first light arm 176 of the supplemental image display 170 is positioned such that it can rotate in a third orbit concentrically about and spaced from the cylindrical outer surface of reel 118; and (6) the second light arm 177 of the supplemental image display 170 is positioned such that it can rotate in the same third orbit concentrically about and spaced from the cylindrical outer surface of reel 118.

In this illustrated example embodiment, the first orbit is a designated first distance away from the first reel 114, the second orbit is a designated second distance away from the second reel 116, and the third orbit is a designated third distance away from the third reel 118. In this illustrated example embodiment, the designated first distance, the designated second distance, and the designated third distance are all the same or approximately the same; although it should be appreciated that these distances may be different in accordance with the present disclosure. It should further be appreciated that because the designated first distance, the designated second distance, and the designated third distance are all the same or approximately the same, the supplemental image displays 130, 150, and 170 can co-act to display integrated or co-acting player perceivable images in the adjacent orbits such as the example player perceivable images shown in FIGS. 1, 5, 6, 7, and 8 as further discussed below. It should further be appreciated that in the alternative embodiments where two or more of the designated first distance, the designated second distance, and the designated third distance are not the same or approximately the same, the supplemental image displays 130, 150, and 170 can co-act to display alternatively shaped integrated or co-acting player perceivable images in different orbits. In other embodiments, the supplemental image displays 130, 150, and 170 provide separate player perceivable images in their respective orbits.

In this illustrated example embodiment, each of the separately illuminable lights 138*a* to 138*i*, 158*a* to 151*i*, and 178*a* to 178*i*, each include one or more light emitting diodes (LEDs) that are each suitably electrically connected to a suitable light board, light control panel, or other suitable controller or control mechanism (not shown) configured to operate with a processor (not shown) of the EGM to selectively illuminate each of these lights of the light arms. In various embodiments, certain groups of these illuminable lights can be controlled or illuminated in groups in accordance with the present disclosure. In certain embodiments of the present disclosure, all of these illuminable lights are of the same color when illuminated (such as all providing a red light). In other embodiments of the present disclosure, two or more of these illuminable lights are of different colors when illuminated (such as all providing red and green lights). In other embodiments of the present disclosure, one or more of these lights are each configured to selectively provide different colors when illuminated (such as all providing red and green lights).

The separately illuminable lights 138*a* to 138*i*, 158*a* to 158*i*, and 178*a* to 178*i* are configured, arranged, and positioned to selectively indicate different player perceivable images associated with, exterior to, and in front of the rotatable reels 114, 116, and 118.

Figure 1:
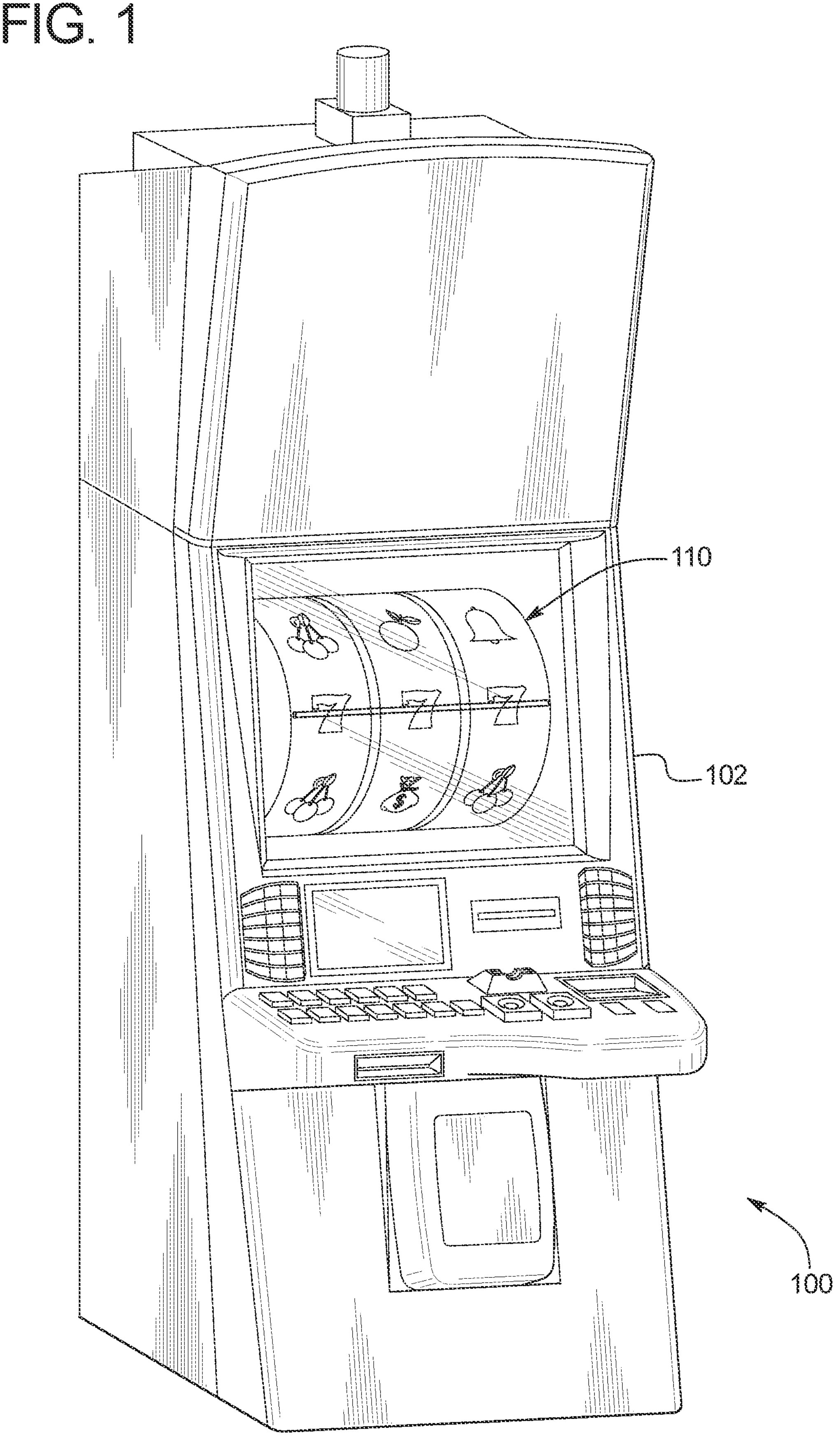
FIG. 1 is a diagrammatic perspective view of an electronic gaming machine of one example embodiment of the present disclosure and having a reel assembly including a plurality of rotatable reels and a plurality of supplemental image displays respectively associated with the plurality of rotatable reels.
Figure 2:
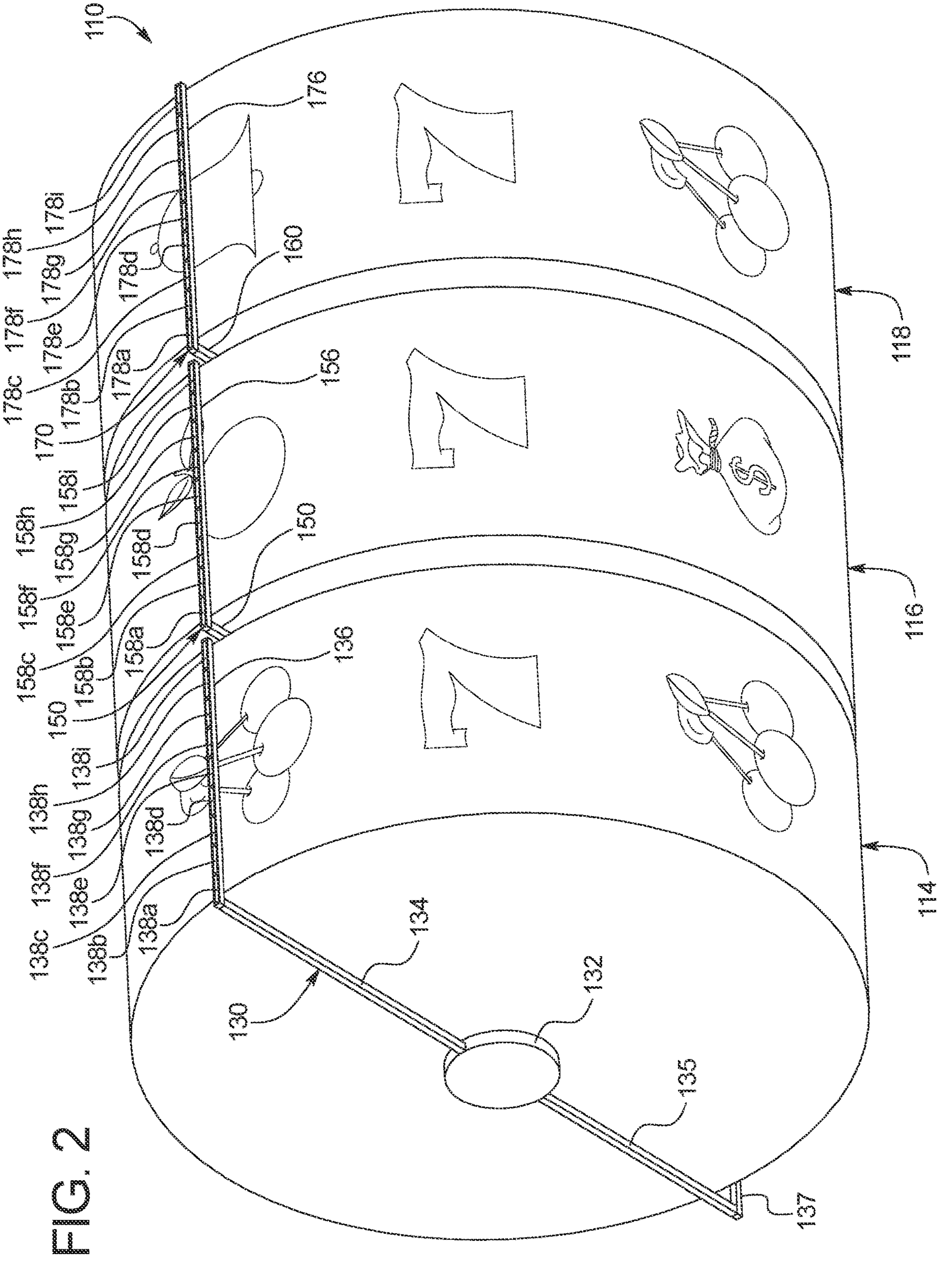
FIG. 2 is an enlarged diagrammatic perspective view of the reel assembly of the electronic gaming machine of FIG. 1, shown removed from the housing of the electronic gaming machine.
Figure 3:
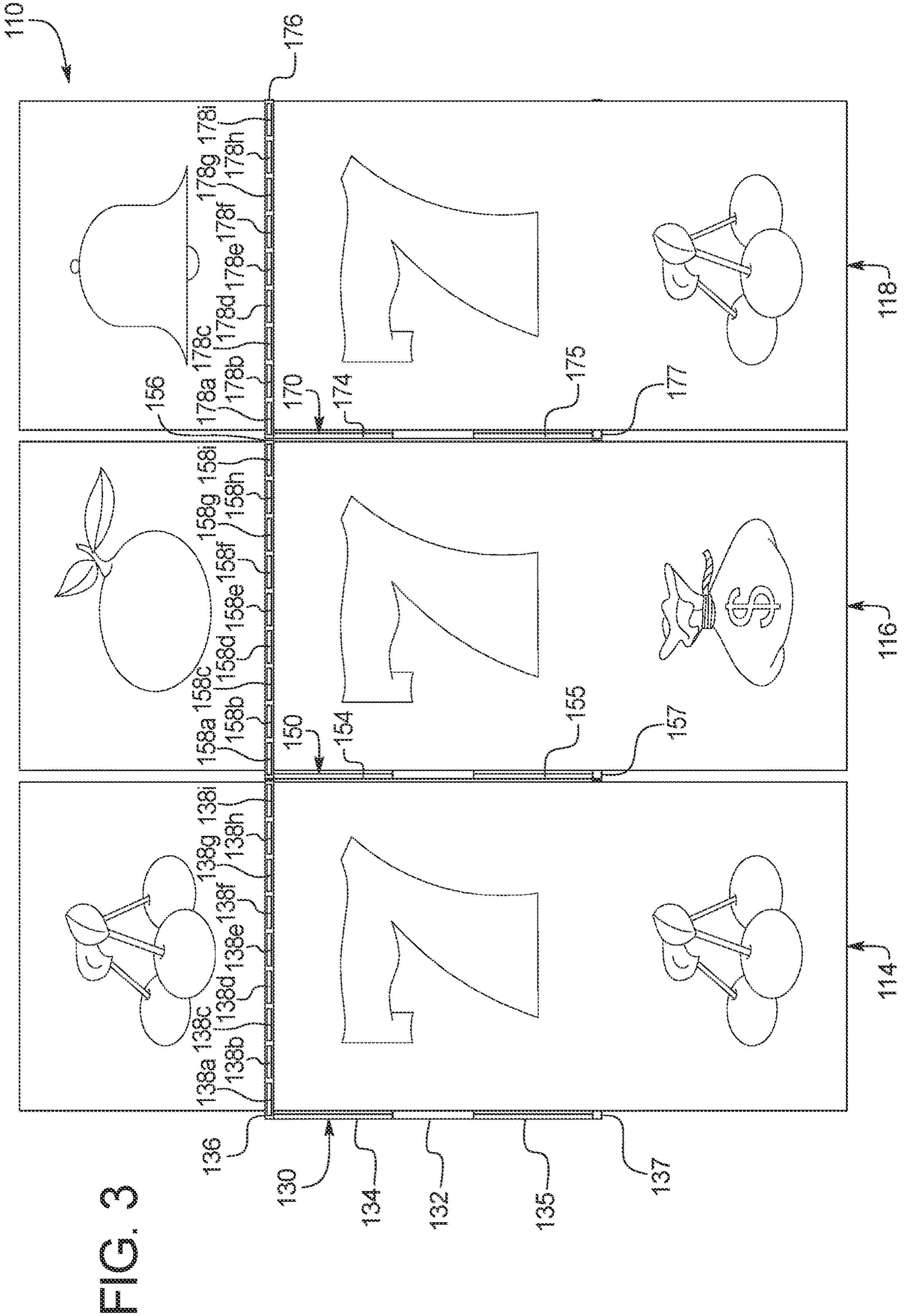
FIG. 3 is an enlarged diagrammatic front view of the reel assembly of the electronic gaming machine of FIG. 1, shown removed from the housing of the electronic gaming machine.
Figure 4:
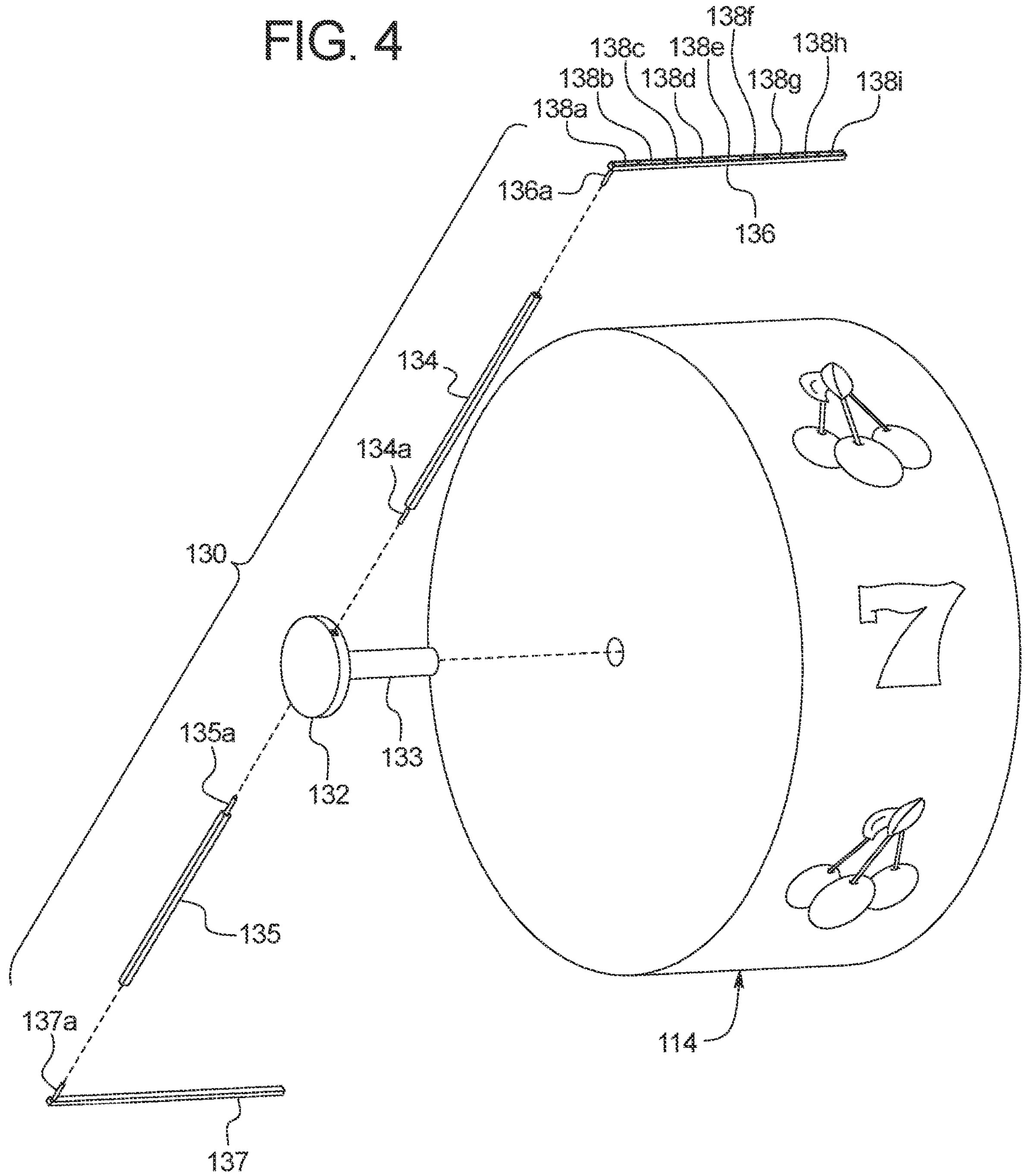
FIG. 4 is an enlarged diagrammatic exploded perspective view of the one of the rotatable reels and one of the supplemental image displays of the reel assembly of the electronic gaming machine of FIG. 1, shown removed from the housing of the electronic gaming machine.
Figure 5:
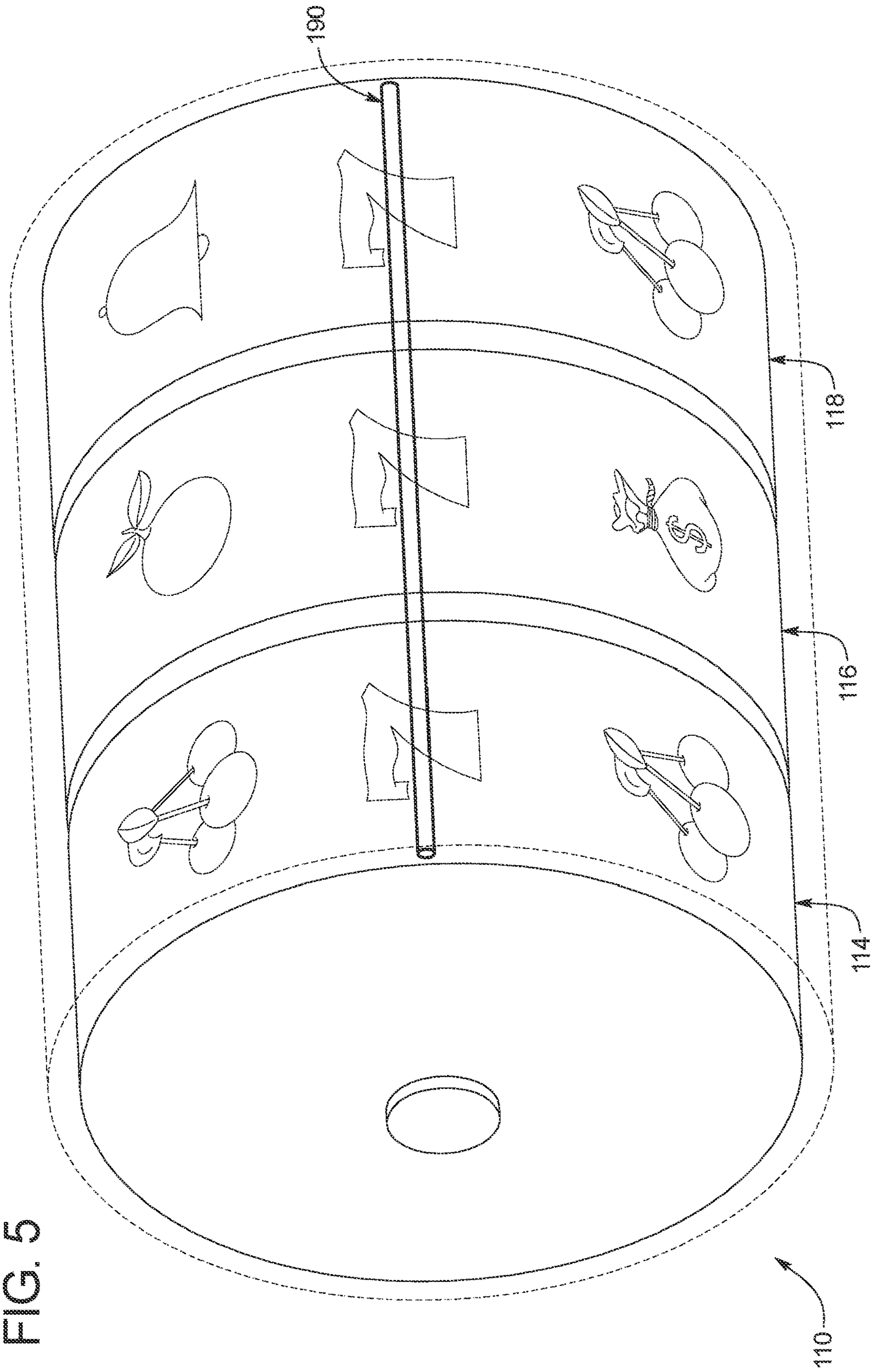
FIG. 5 is an enlarged diagrammatic perspective view of the reel assembly of the electronic gaming machine of FIG. 1, shown removed from the housing of the electronic gaming machine, and showing the rotatable reels in a stationary position and the supplemental image displays moving and a displaying player perceivable payline image in front of the stationary rotatable reels.
Figure 6:
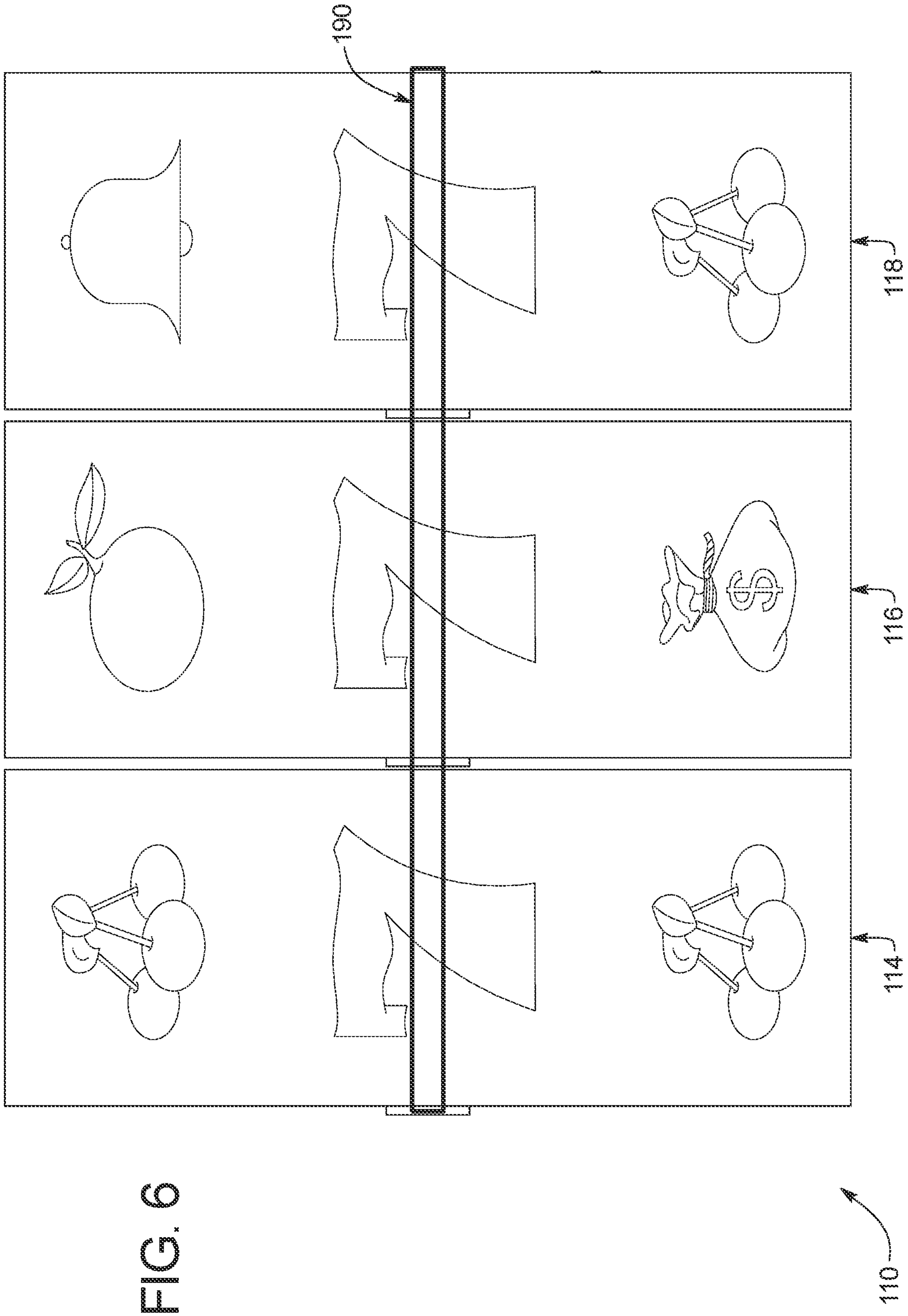
FIG. 6 is an enlarged diagrammatic front view of the reel assembly of the electronic gaming machine of FIG. 1, shown removed from the housing of the electronic gaming machine, and showing the rotatable reels in a stationary position and the supplemental image displays moving and displaying a player perceivable payline image in front of the stationary rotatable reels.

For example, as shown in FIGS. 1, 5, and 6, in this illustrated example embodiment, the supplemental image displays 130, 150, and 170 and specifically the separately illuminable lights 138*a* to 138*i*, 158*a* to 158*i*, and 178*a* to 178*i* of the first light arms 136, 156, and 176 and the separately illuminable lights (not labeled) of the second light arms 137, 157, and 177 are configured to co-act to display integrated player perceivable payline images which form a combined player perceivable payline image 190 associated with the rotatable reels 114, 116, and 118. In other embodiments, the combination of supplemental image displays 130, 150, and 170 may co-act to display payline images that are not continuous like the player perceivable payline image 190 shown in FIGS. 5 and 6.

It should further be appreciated that the supplemental image displays 130, 150, and 170 may co-act to display multiple payline images for paylines with one or more horizontal components, paylines with one or more vertical components, paylines with one or more diagonal components, and paylines with other forms or components.

It should further be appreciated that the supplemental image displays 130, 150, and 170 may co-act to display multiple payline images for multiple paylines (such as three vertically adjacent paylines associated with the rotatable reels 114, 116, and 118).

It should further be appreciated that the supplemental image displays 130, 150, and 170 may co-act to payline images that indicate scatter pays and individual winning symbols (such as a single winning cherry symbol) which for the purposes of this disclosure will be considered a winning symbol combination. In such embodiments, the payline images can be: (a) sequentially illuminated (once or more than once) to indicate the winning symbol combination on the reels; or (b) simultaneously illuminated (once, more than once, or continuously for a period of time) to indicate the winning symbol combination on the reels, in accordance with the present disclosure. In such embodiments, if multiple winning symbol combinations occur on the reels 114, 116, and 118 for a play of the game, the EGM can: (1) sequentially display the payline images (using the same colors or using different colors); (2) simultaneously display the payline images (such as using different colors); or (3) both sequentially and simultaneously display the payline images.

Figure 7:
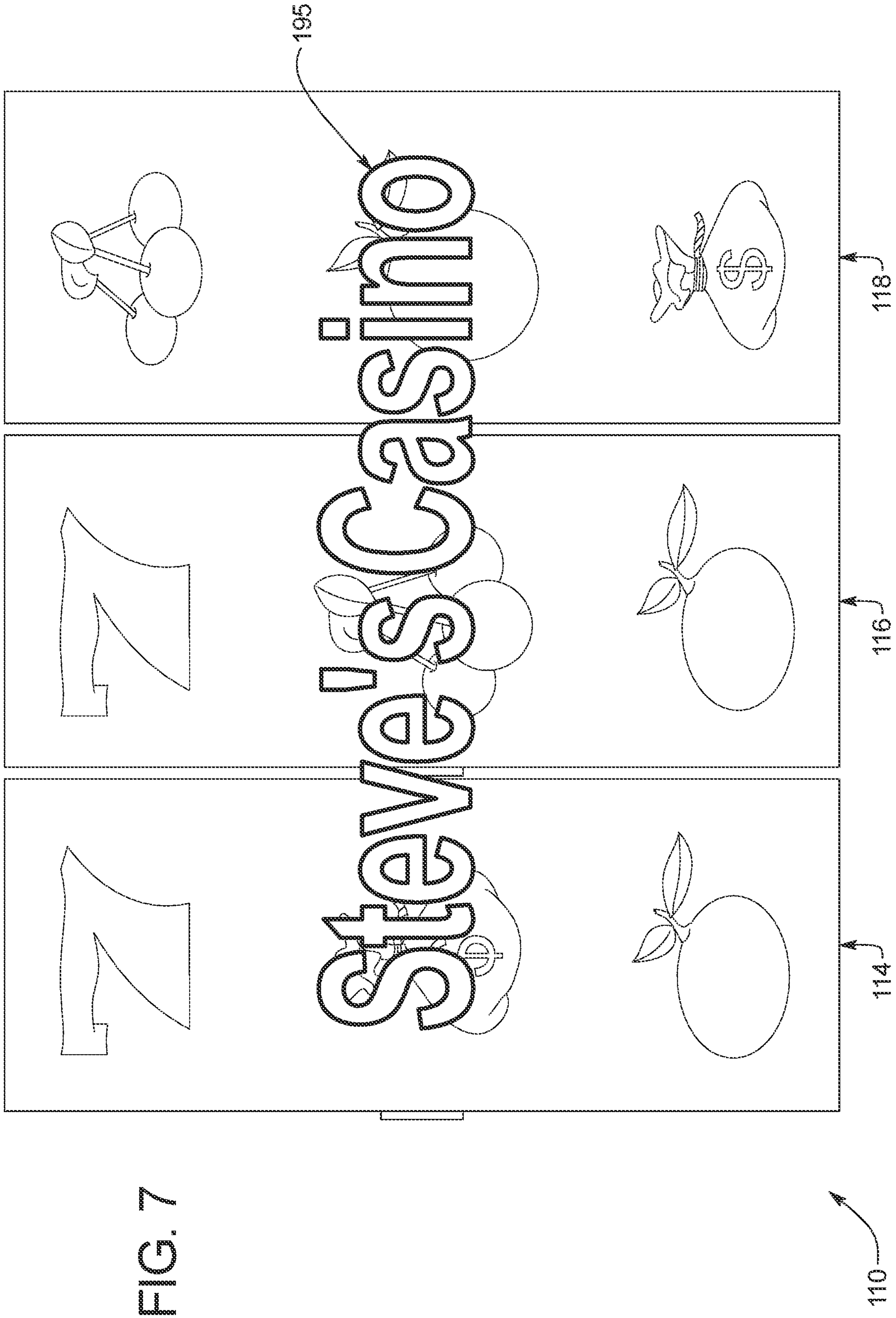
FIG. 7 is an enlarged diagrammatic perspective view of the reel assembly of the electronic gaming machine of FIG. 1, shown removed from the housing of the electronic gaming machine, and showing the rotatable reels stationary and the supplemental image displays moving and displaying a player perceivable image including a combination of example letters in front of the stationary rotatable reels.
Figure 8:
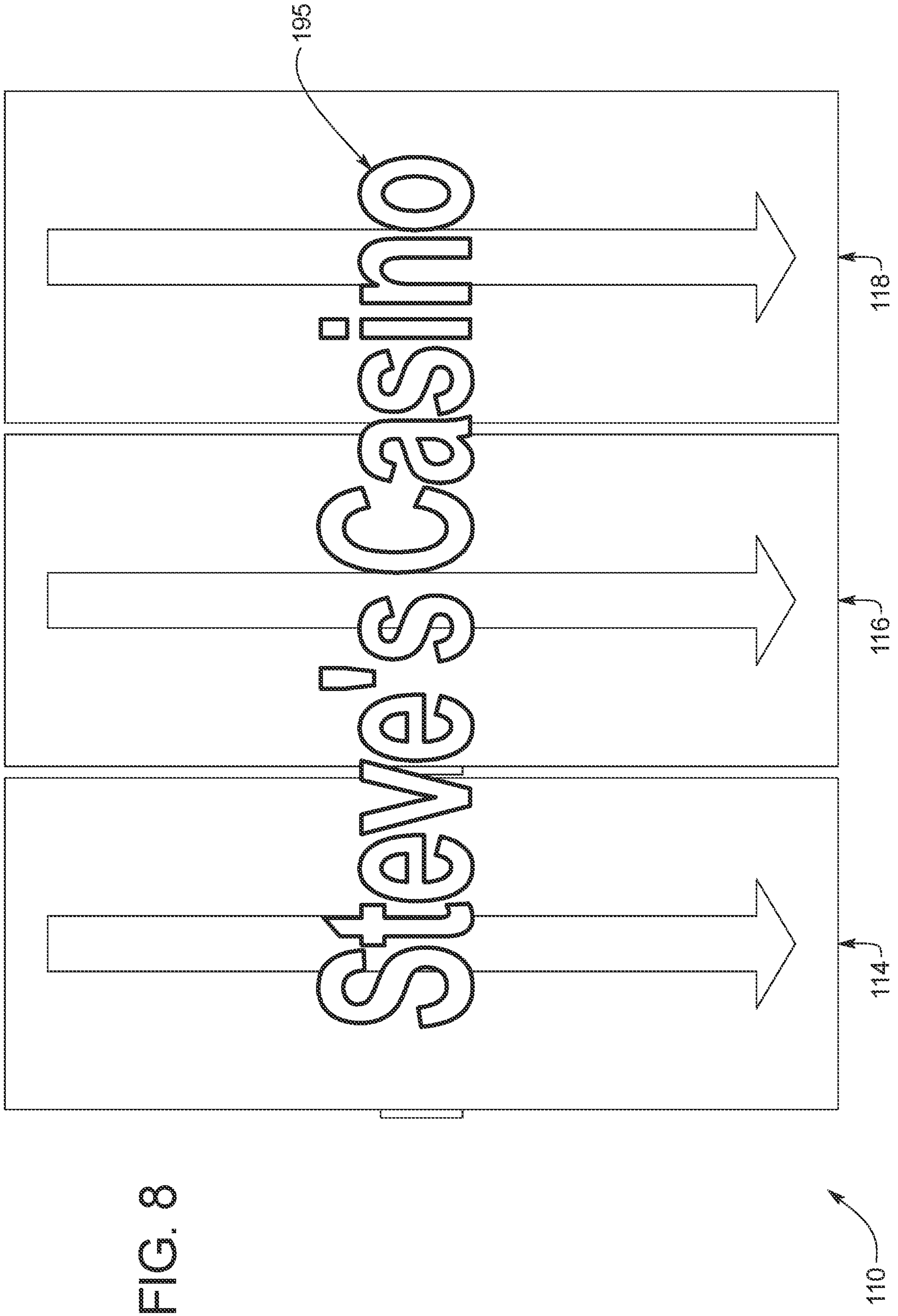
FIG. 8 is an enlarged diagrammatic perspective view of the reel assembly of the electronic gaming machine of FIG. 1, shown removed from the housing of the electronic gaming machine, and showing the reels rotating and the supplemental image displays moving and displaying a player perceivable image including a combination of example letters in front of the rotating reels.

In further example embodiments shown in FIGS. 7 and 8, the supplemental image displays 130, 150, and 170 and specifically the separately illuminable lights 138*a* to 138*i*, 158*a* to 158*i*, and 178*a* to 178*i* of the first light arms 136, 156, and 176 and the separately illuminable lights (not labeled) of the second light arms 137, 157, and 177 are configured to co-act to display a player perceivable image 195 including a combination of example letters in front of the reels 114, 116, and 118. FIG. 7 shows this in front of the reels 114, 116, and 118 when the reels 114, 116, and 118 are stationary; and FIG. 8 shows this in front of the reels 114, 116, and 118 when the reels 114, 116, and 118 are rotating. In other embodiments, the combination of supplemental image displays 130, 150, and 170 may co-act to display such images that are not continuous as the player perceivable image 195 shown in FIGS. 7 and 8. In further example embodiments, the supplemental image displays can be employed to display one or more images that include one or more symbols, win amounts, attract modes, or other game play related images. It should be appreciated from this example that the supplemental image displays can be employed to display any suitable images.

The present disclosure further contemplates that the arrangements of the supplemental image displays including the light arms and lights of the light arms can vary.

For example, in further alternative example embodiments of the present disclosure, each supplemental image display associated with each rotatable reel includes two light arms and each light arm includes twelve lights. In one such example embodiment of the present disclosure, the positioning of the lights of each light arm is offset from the positioning of the lights of the other light arm. In this example embodiment, the light arms with the different alternating positioned light can provide a net effect of twenty-four lights for one full rotation of the supplemental image display as shown in the following table (where each + represents a light). Thus, in the example embodiment, the first lights of the first light arm and the second lights of the second light arm are positioned at transversely offset positions relative to each other and relative to the respective rotatable reel.

Table 1

| | |
|---|---|
| Light Arm 1 | + + + + + + + + + + + + |
| Light Arm 2 | + + + + + + + + + + + + |

For further alternative example embodiments of the present disclosure, each supplemental image display is associated with each reel rotatable includes four light arms and each light arm includes twelve lights. In one such example embodiment of the present disclosure, the positioning of the lights of each of two of the light arms is offset from the positioning of the lights of each of two of the other light arms. In this example embodiment, the light arms with the different alternating lights can alternate to provide a net effect of twenty-four lights for each half rotation of the supplemental image display as shown in the following table (where each + represents a light). Thus, in the example embodiment, (1) the first lights of the first light arm and the second lights of the second light arm are positioned at transversely offset positions relative to each other and relative to the respective rotatable reel; and (2) third lights of the third light arm and the fourth lights of the fourth light arm are positioned at transversely offset positions relative to each other and relative to the respective rotatable reel.

Table 2

| | |
|---|---|
| Light Arm 1 | + + + + + + + + + + + + |
| Light Arm 2 | + + + + + + + + + + + + |
| Light Arm 3 | + + + + + + + + + + + + |
| Light Arm 4 | + + + + + + + + + + + + |

In these example embodiments, the distance between each pair of respective lights is reduced or split due to the alternating patterns of lights such that the net effect of the lights generates a better player perceivable image. It should also be appreciated that the quantity of light arms with lights at offset positions can vary in accordance with the present disclosure. For example, the supplemental image display can include six arms with the lights in three different offset positions, or five arms with the light in five offset positions.

Referring now to FIGS. 9, 10, 11, 12, 13, 14, 15, and 16, another example embodiment of an EGM of the present disclosure is illustrated and generally indicated by numeral 1100. This example EGM 1100 includes a suitable housing 1102 that supports numerous components of the EGM 1100. It should be appreciated that only certain of these components are illustrated and described herein, and that one of ordinary skill in the art would understand the various components not illustrated or described herein.

The housing 1102 defines an interior compartment (not labeled). The EGM 1100 includes a reel assembly 1110 at least partially positioned in and supported by the housing 1102. Generally, in this illustrated example embodiment, the reel assembly 1110 includes: (1) a suitable frame (not shown); (2) a plurality of individual rotatable reels such as rotatable reels 1114, 1116, 1118, 1120, and 1122 suitably supported by the frame; (3) a plurality of suitable reel actuators (not shown) suitably respectively coupled to the rotatable reels 1114, 1116, 1118, 1120, and 1122 and configured to rotate the reels 1114, 1116, 1118, 1120, and 1122; (4) a single supplemental image display such as supplemental image display 1130 suitably supported by the frame and positioned partially adjacent to the side of the rotatable reel 1114 and partially exterior to the rotatable reels 1114, 1116, 1118, 1120, and 1122; and (5) a suitable supplemental image display actuator (not shown) suitably respectively coupled to the supplemental image display 1130. Each of these rotatable reels 1114, 1116, 1118, 1120, and 1122 includes a reel strip (not labeled) that includes a plurality of different symbols (not labeled) thereon in a conventional manner. It should be appreciated that the reel assembly 1110 (in this example embodiment and various other embodiments described herein) is positioned in the housing 1102 behind a see through plastic or glass panel (not shown) in a conventional manner to prevent access to the reel assembly 1110.

In this illustrated example embodiment, supplemental image display 1130 includes: (1) a central hub 1132 suitably connected by an axle 1133 to a suitable supplemental image display actuator (not shown) configured to rotate the axle 1133 and thus the entire the supplemental image display 1130; (2) a first extension arm 1134 suitably connected to (such as by connection pin 1134*a*) and extending outwardly from the central hub 1132; (3) a second extension arm 1135 suitably connected to (such as by connection pin 1135*a*) and extending outwardly from the central hub 132; (4) a first light arm 136 suitably connected to (such as by connection pin 1134*b*) and extending transversely from the first extension arm 1134; and (5) a second light arm 1137 suitably connected to (such as by connection pin 1135*b*) and extending transversely from the second extension arm 1135. In this illustrated example embodiment, the first light arm 1136 includes a plurality of selectively and individually illuminable lights 1138*a* to 1138*z* connected to, supported by, and positioned on a front outwardly facing side of the first light arm 1136 (opposite the side of the light arm 1136 that faces the rotatable reels 1114, 1116, 1118, 1120, and 1122). Likewise, in this illustrated example embodiment, the second light arm 1137 includes a plurality of selectively and individually illuminable lights (not shown) connected to, supported by, and positioned on a front outwardly facing side of the second light arm 1137 (opposite the side of the light arm 1137 that faces the rotatable reels 1114, 1116, 1118, 1120, and 1122). Although not shown, the lights are suitably connected to a suitable electric power source. For example, the electric power for or to the individually illuminable lights can be provided by one or more wireless induction mechanisms, one or more batteries, and/or by one or more slip ring mechanisms.

In this illustrated example embodiment: (1) the first extension arm 1134 of the supplemental image display 1130 is positioned adjacent to a first side of rotatable reel 1114; and (2) the second extension arm 1135 of the supplemental image display 1130 is positioned adjacent to the first side of rotatable reel 1114.

Additionally, in this illustrated example embodiment: (1) the first light arm 1136 of the supplemental image display 1130 is positioned spaced apart from cylindrical outer surfaces of reels 1114, 1116, 1118, 1120, and 1122 such that it can rotate in a first orbit concentrically about and spaced from the cylindrical outer surfaces of rotatable reels 1114, 1116, 1118, 1120, and 1122; and (2) the second light arm 1137 of the supplemental image display 1130 is positioned such that it can rotate in the same first orbit concentrically about and spaced from the cylindrical outer surfaces of rotatable reels 1114 1116, 1118, 1120, and 1122.

In this illustrated example embodiment, the first orbit is a designated first distance away from each of the rotatable reels 1114, 1116, 1118, 1120, and 1122, and the second orbit is a designated second distance away from each of the rotatable reels 1114, 1116, 1118, 1120, and 1122. In this illustrated example embodiment, the designated first distance and the designated second distance are the same or approximately the same.

In this illustrated example embodiment, each of the separately illuminable lights (such as lights 1138*a* to 1138*z*) each include one or more light emitting diodes (LEDs) that are each suitably electrically connected to a suitable light board, light control panel, or other suitable controller or control mechanism (not shown) configured to operate with a processor (not shown) of the EGM to selectively illuminate each of these lights of the light arms. In various embodiments, certain groups of these illuminable lights can be controlled or illuminated in groups in accordance with the present disclosure. In certain embodiments of the present disclosure, all of these illuminable lights are of the same color when illuminated (such as all providing a red light). In other embodiments of the present disclosure, two or more of these illuminable lights are of different colors when illuminated (such as all providing red and green lights). In other embodiments of the present disclosure, one or more of these lights are each configured to selectively provide different colors when illuminated (such as all providing red and green lights).

The separately illuminable lights are configured, arranged and positioned to selectively indicate different player perceivable images associated with, exterior to, and in front of the rotatable reels 1114, 1116, 1118, 1120, and 1122.

Figure 9:
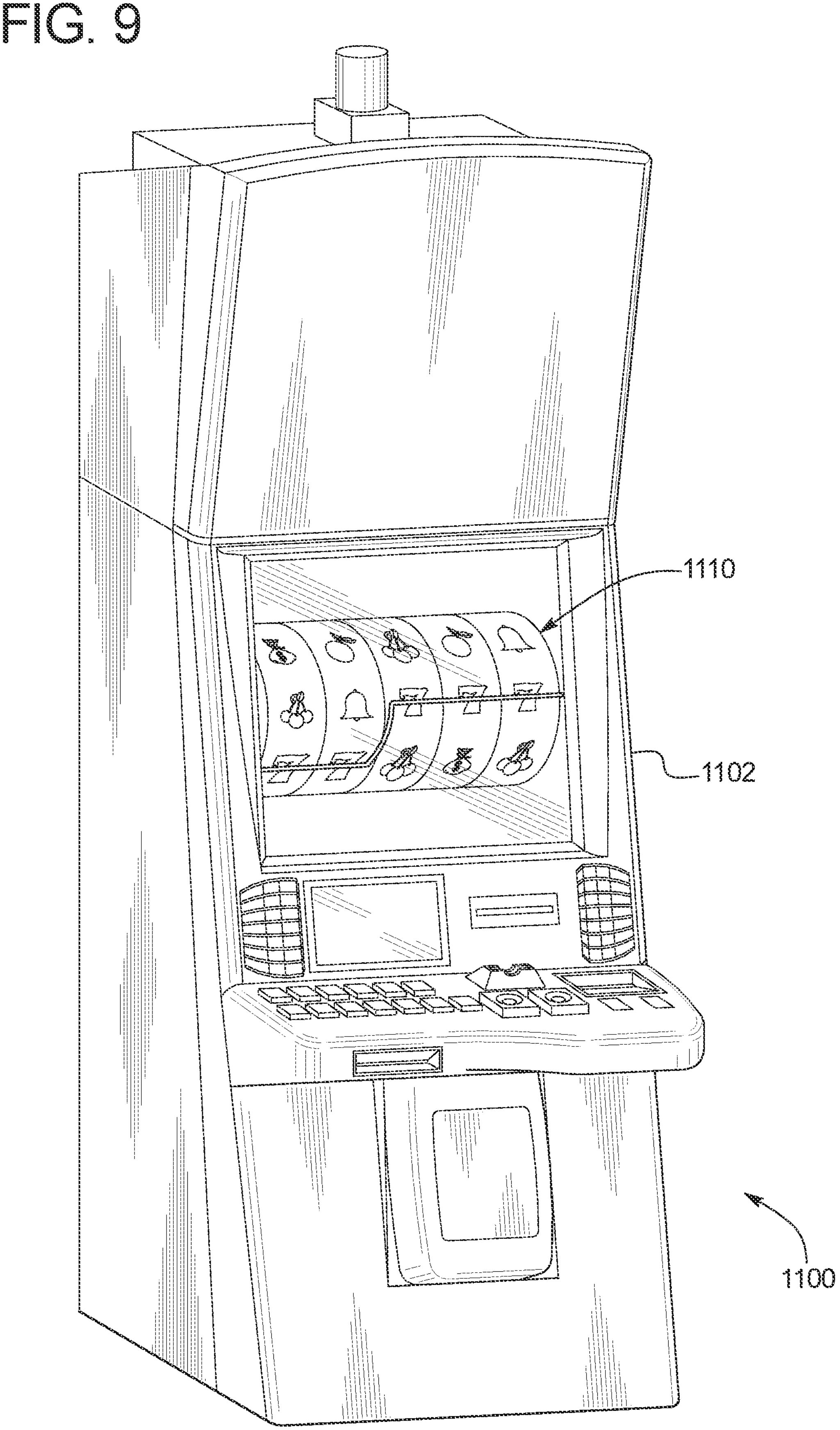
FIG. 9 is a diagrammatic perspective view of an electronic gaming machine of another example embodiment of the present disclosure and having a reel assembly including a plurality of rotatable reels and a supplemental image display associated with the plurality of rotatable reels.
Figure 10:
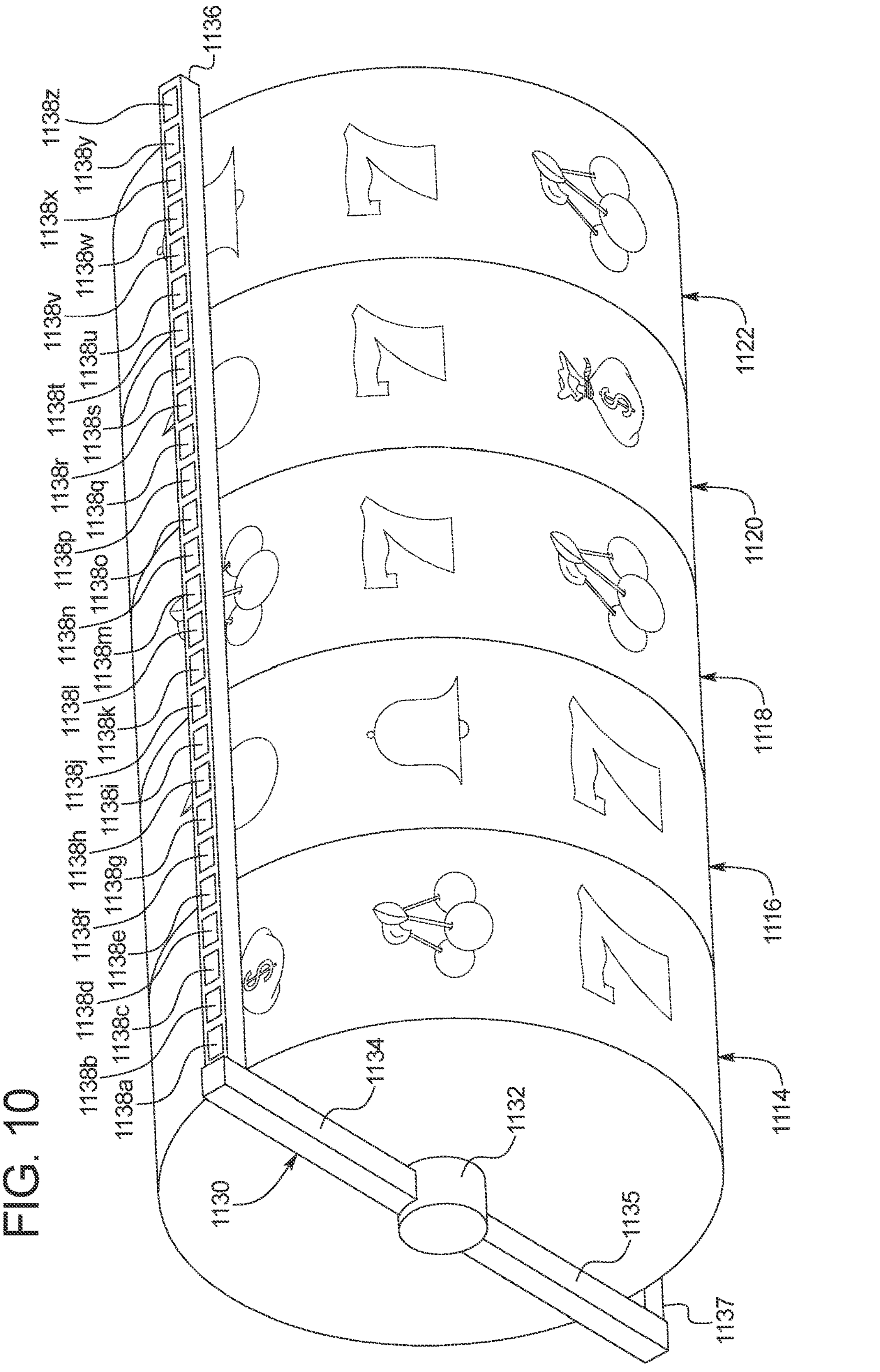
FIG. 10 is an enlarged diagrammatic perspective view of the reel assembly of the electronic gaming machine of FIG. 1, shown removed from the housing of the electronic gaming machine.
Figure 11:
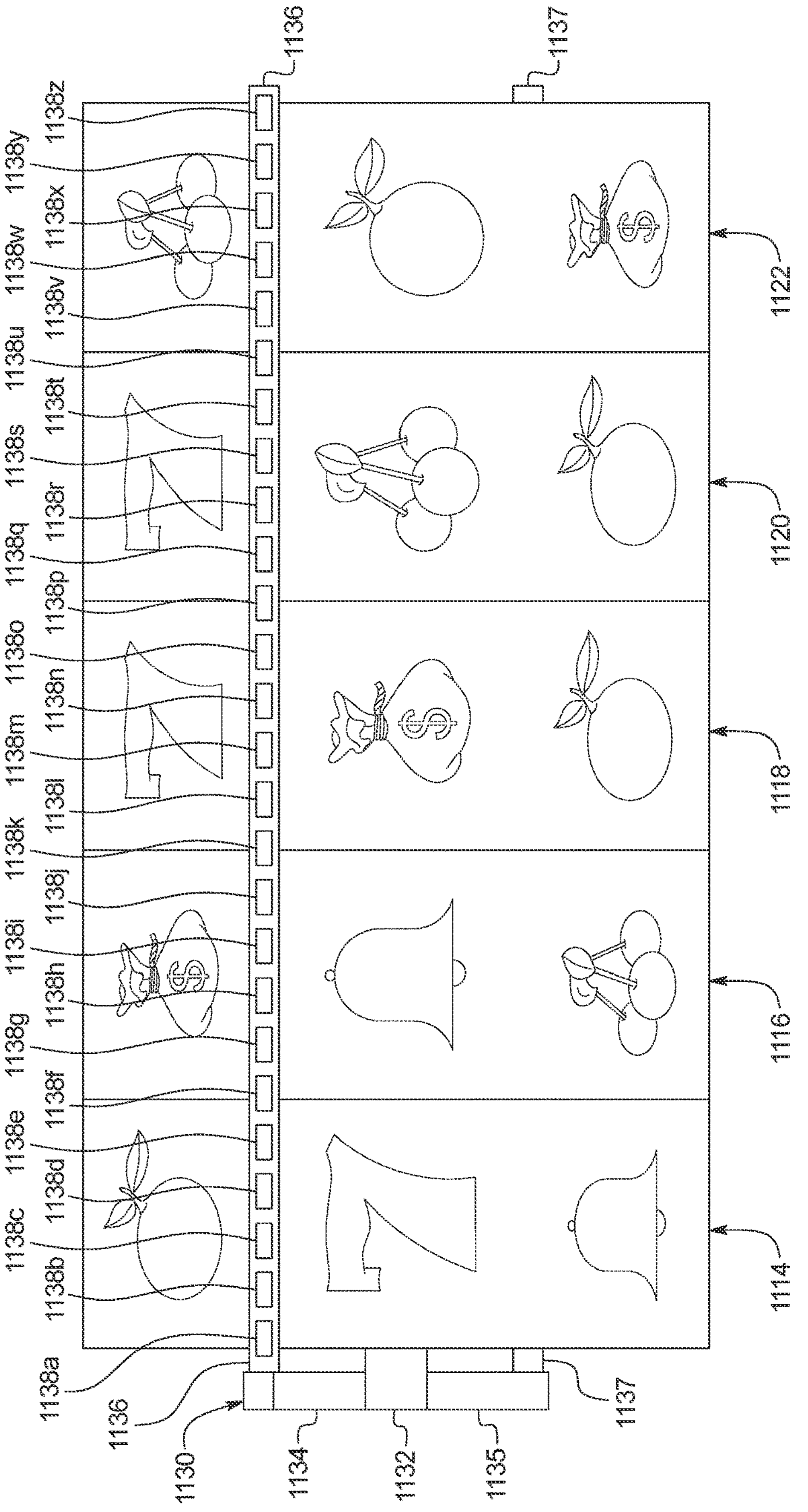
FIG. 11 is an enlarged diagrammatic front view of the reel assembly of the electronic gaming machine of FIG. 1, shown removed from the housing of the electronic gaming machine.
Figure 12:
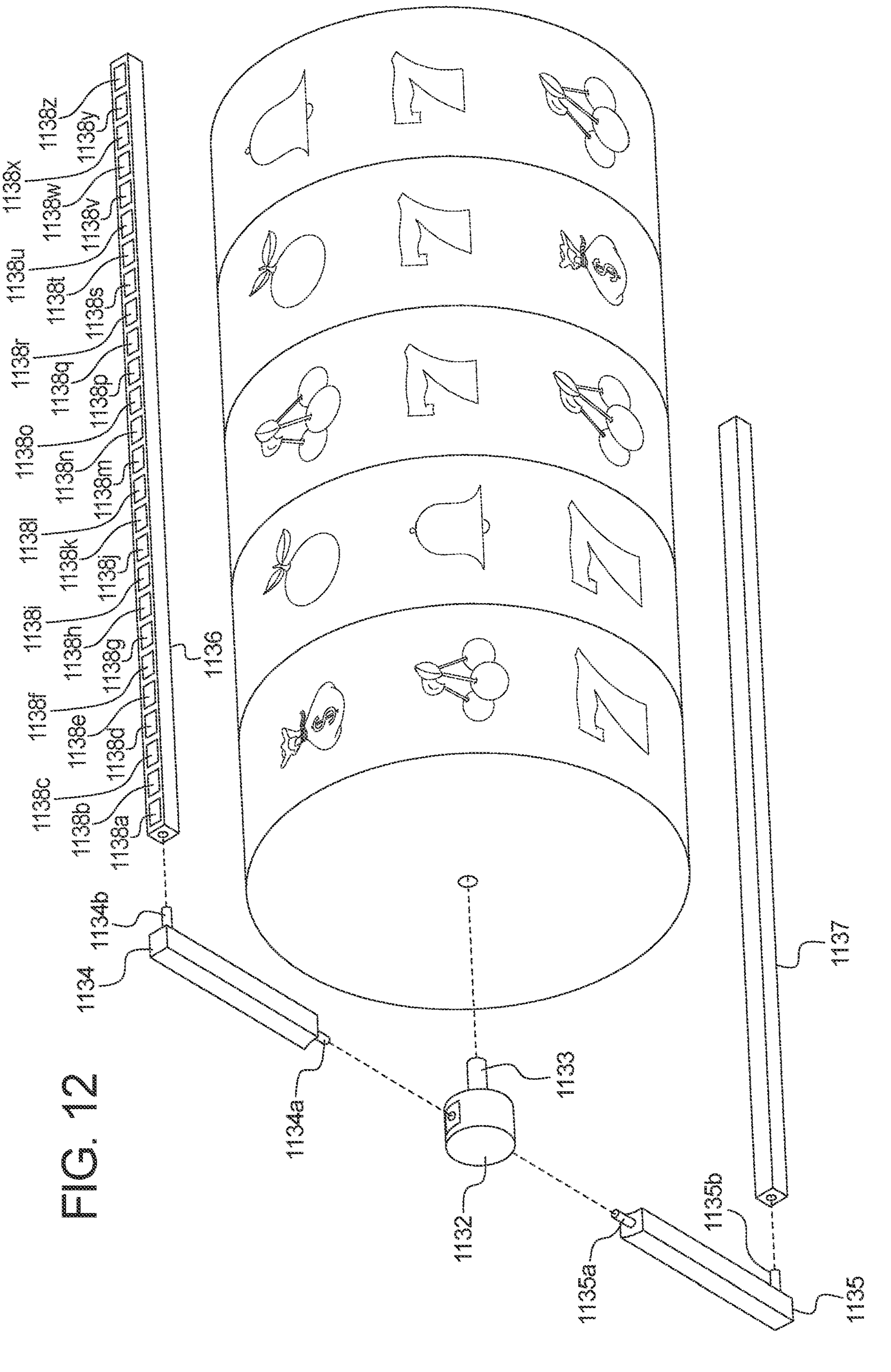
FIG. 12 is an enlarged diagrammatic partial exploded perspective view of the rotatable reels and the supplemental image display of the reel assembly of the electronic gaming machine of FIG. 1, shown removed from the housing of the electronic gaming machine.
Figure 13:
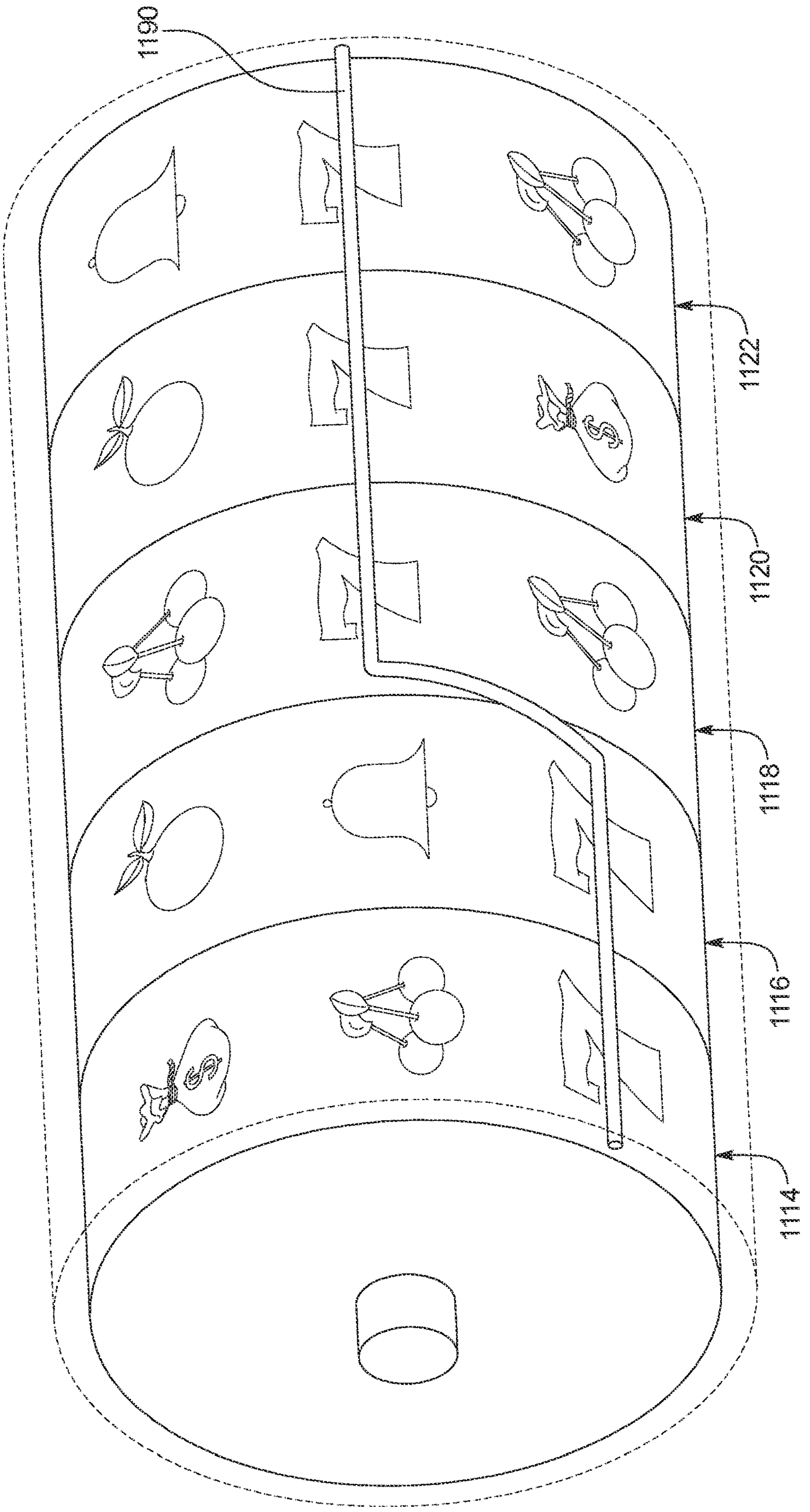
FIG. 13 is an enlarged diagrammatic perspective view of the reel assembly of the electronic gaming machine of FIG. 1, shown removed from the housing of the electronic gaming machine, and showing the rotatable reels in a stationary position and the supplemental image display moving and displaying a player perceivable payline image in front of the stationary rotatable reels.
Figure 14:
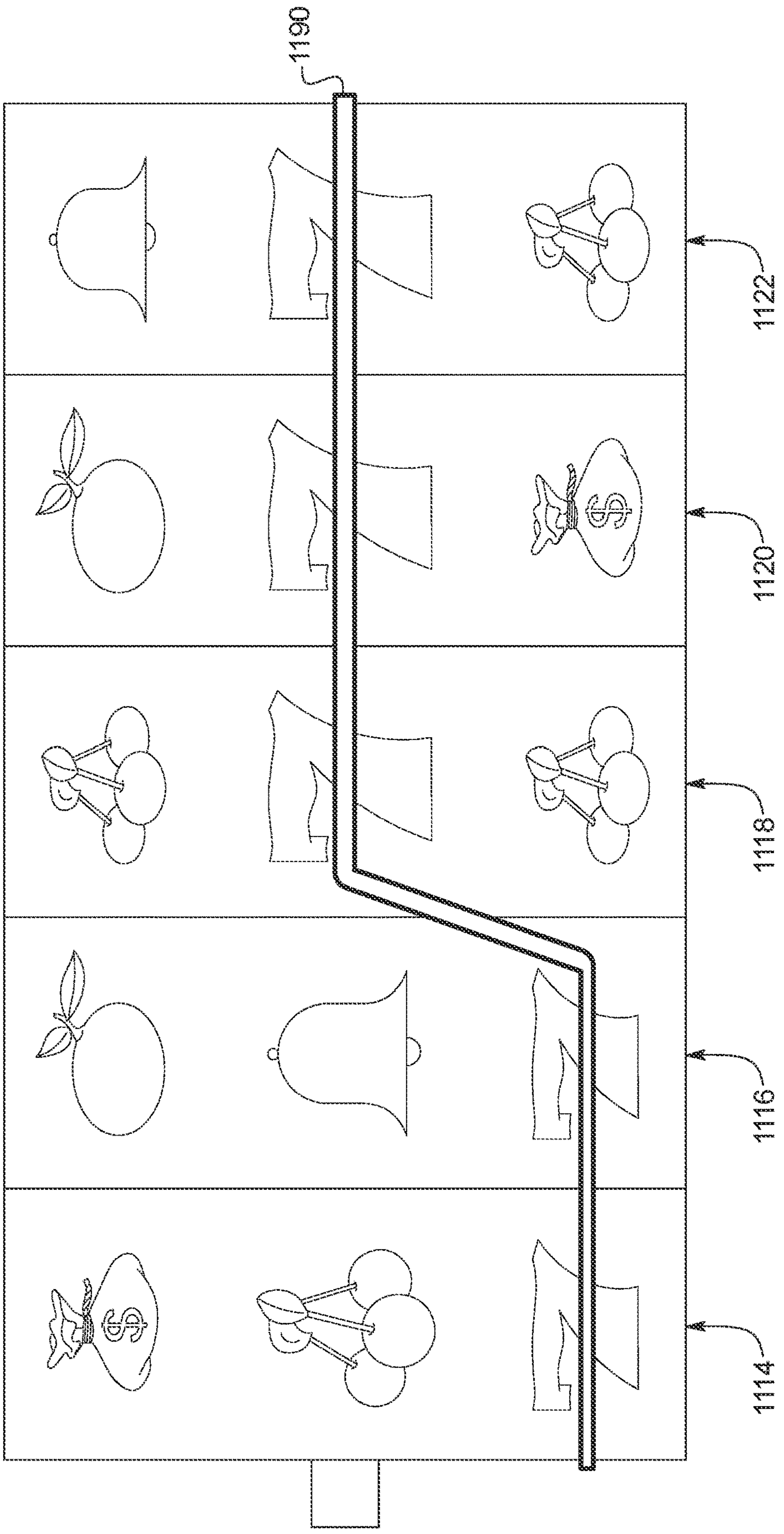
FIG. 14 is an enlarged diagrammatic front view of the reel assembly of the electronic gaming machine of FIG. 1, shown removed from the housing of the electronic gaming machine, and showing the rotatable reels in a stationary position and the supplemental image display moving and a player perceivable payline image in front of the stationary rotatable reels.

For example, as shown in FIGS. 9, 13, and 14, in this illustrated example embodiment, the supplemental image display 1130 and specifically the separately illuminable lights 1138*a* to 1138*z* of the first light arm 1136 and the separately illuminable lights (not labeled) of the second light arm 1137 are configured to co-act to a display player perceivable image 1190 associated with the rotatable reels 1114, 1116, 1118, 1120, and 1122. In other embodiments, the supplemental image display 1130 may display payline images that are not continuous as the player perceivable payline image 1190 shown in FIGS. 13 and 14.

It should further be appreciated that the supplemental image display 1130 may display multiple payline images for paylines with one or more horizontal components, paylines with one or more vertical components, paylines with one or more diagonal components, and paylines with other forms or components.

It should further be appreciated that the supplemental image display 1130 may display multiple payline images for multiple paylines (such as five vertically adjacent paylines associated with the rotatable reels 1114, 1116, 1118, 1120, and 1122).

It should further be appreciated that the supplemental image display 1130 may display payline images that indicate scatter pays and individual winning symbols (such as a single winning cherry symbol). In such embodiments, the payline images can be: (a) sequentially illuminated (once or more than once) to indicate the winning symbol combination on the reels; or (b) simultaneously illuminated (once, more than once, or continuously for a period of time) to indicate the winning symbol combination on the rotatable reels, in accordance with the present disclosure. In such embodiments, if multiple winning symbol combinations occur on the rotatable reels 1114, 1116, 1118, 1120, and 1122 for a play of the game, the EGM can: (1) sequentially display the payline images (using the same colors or using different colors); (2) simultaneously display the payline images (such as using different colors); or (3) both sequentially and simultaneously display the payline images.

Figure 15:
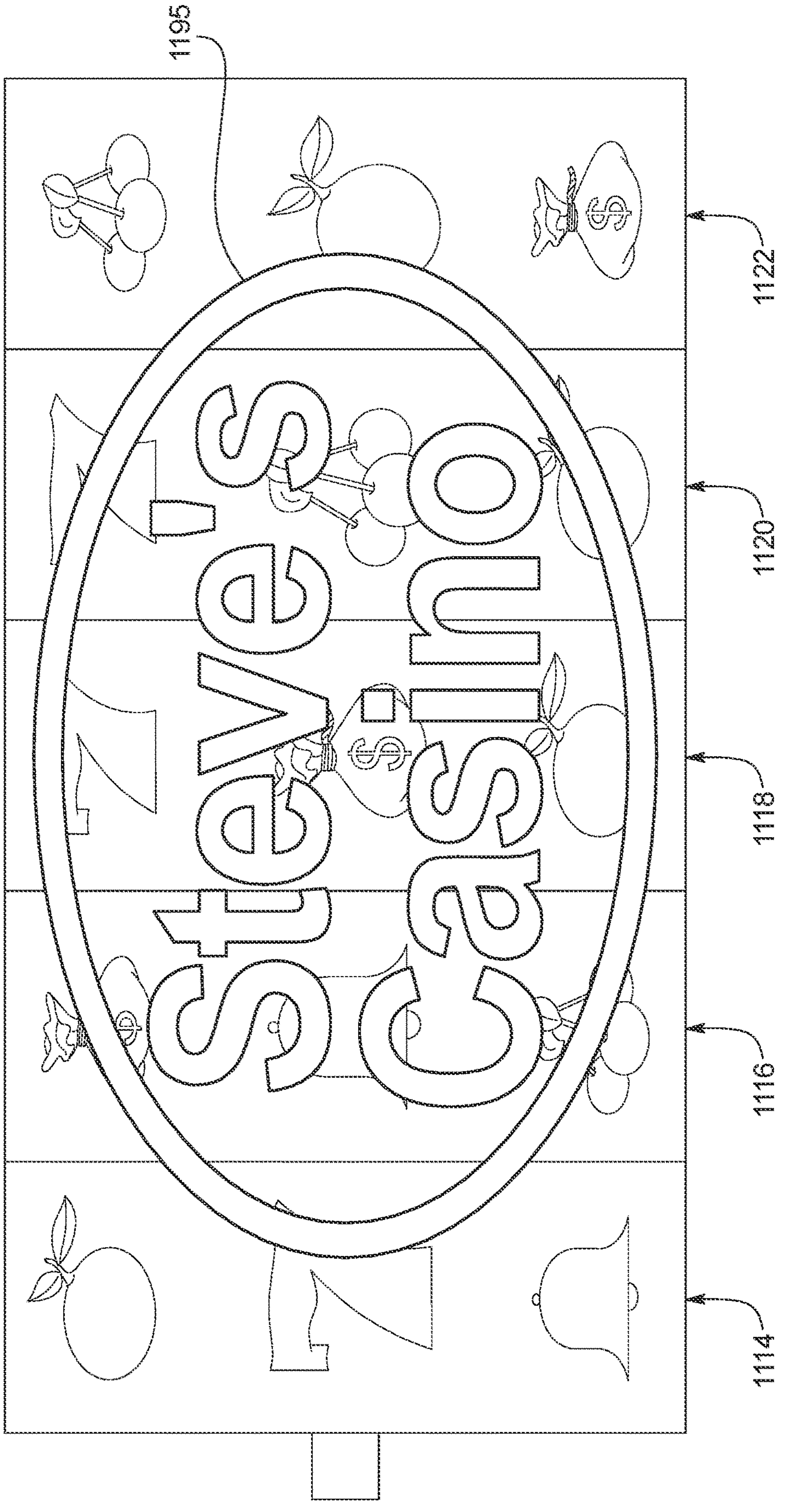
FIG. 15 is an enlarged diagrammatic perspective view of the reel assembly of the electronic gaming machine of FIG. 1, shown removed from the housing of the electronic gaming machine, and showing the rotatable reels in a stationary position and the supplemental image display moving and displaying a player perceivable image including a combination of example letters in front of the stationary reels.
Figure 16:
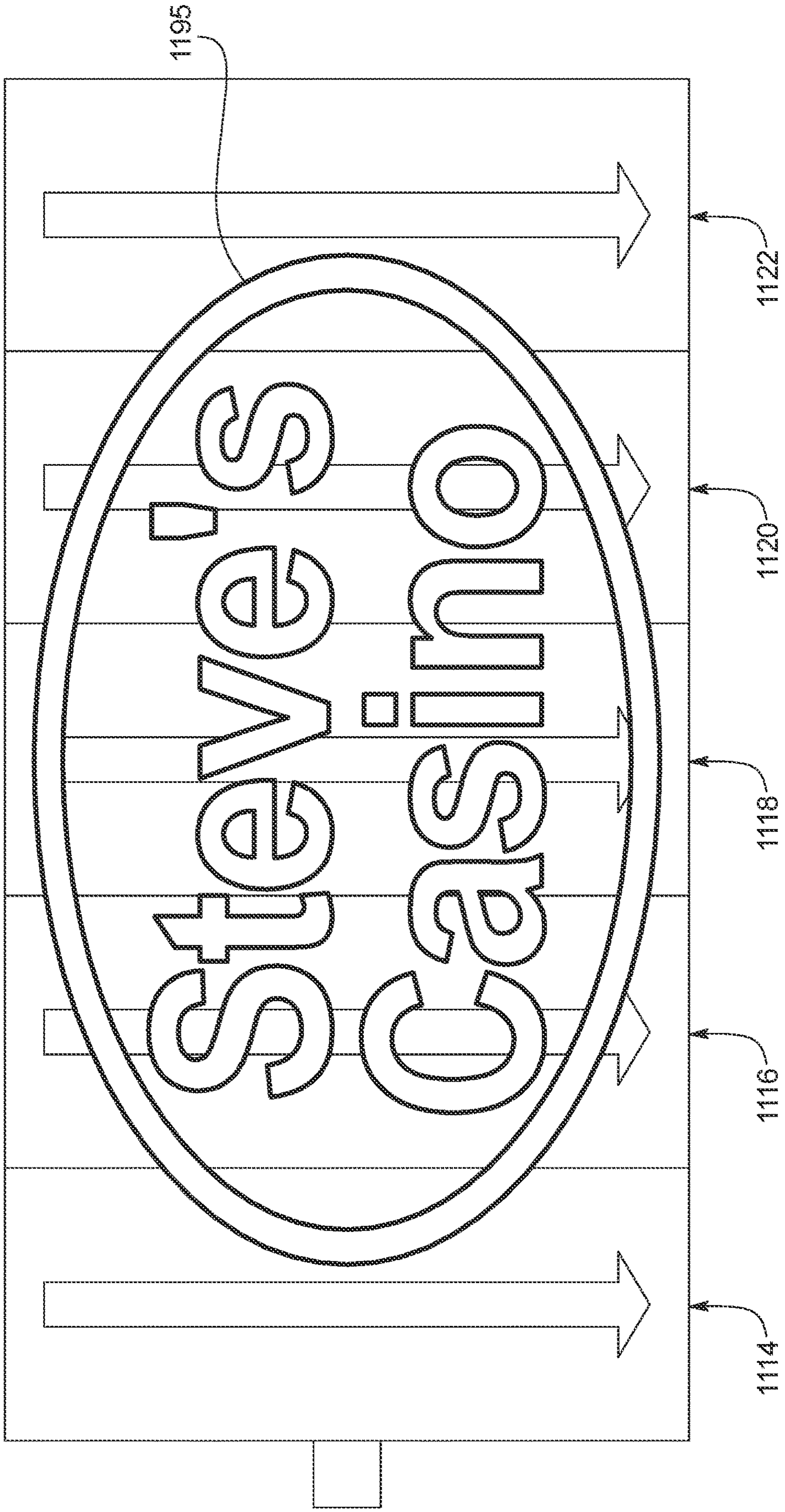
FIG. 16 is an enlarged perspective view of the reel assembly of the electronic gaming machine of FIG. 1, shown removed from the housing of the electronic gaming machine, and showing the reels rotating and the supplemental image display moving and displaying a player perceivable image including a combination of example letters in front of the rotating reels.

In further example embodiments shown in FIGS. 15 and 16, the supplemental image display 1130 and specifically the separately illuminable lights 1138*a* to 1138*z* of the first light arm 1136 and the separately illuminable lights (not labeled) of the second light arm 1137 are configured to co-act to display a player perceivable image 1195 including a combination of example letters in front of the rotatable reels 1114, 1116, 1118, 1120, and 1122. FIG. 15 shows this in front of the rotatable reels 1114, 1116, 1118, 1120, and 1122 when the reels 1114, 1116, 1118, 1120, and 1122 are stationary. FIG. 8 shows this in front of the reels 1114, 1116, 1118, 1120, and 1122 when the reels 1114, 1116, 1118, 1120, and 1122 are rotating. In other embodiments, the supplemental image display 1130 may display other suitable images. As with the above example embodiment, the lights of light arms of this example embodiment may be offset.

Referring now to FIGS. 17, 18, 19, and 20, another example embodiment of an EGM of the present disclosure is illustrated and generally indicated by numeral 2100. This example EGM 2100 includes a suitable housing 2102 that supports numerous components of the EGM 2100. It should be appreciated that only certain of these components are illustrated and described herein, and that one of ordinary skill in the art would understand the various components not illustrated or described herein.

The housing 2102 defines an interior compartment (not labeled). The EGM 2100 includes a reel assembly 2110 at least partially positioned in and supported by the housing 2102. Generally, in this illustrated example embodiment, the reel assembly 2110 includes: (1) a suitable frame (not shown); (2) a plurality of individual rotatable reels such as rotatable reels 2114, 2116, and 2118 suitably supported by the frame; (3) a plurality of suitable reel actuators (not shown) suitably respectively coupled to the rotatable reels 2114, 2116, and 2118 and configured to rotate the reels 2114, 2116, and 2118; and (4) supplemental image displays (such as example supplemental image displays 2115*a*, 2115*b*, 2115*c*, 2115*d*, 2117*a*, and 2119*a*) respectively integrated into the rotatable reels 2114, 2116, and 2118. Each of these rotatable reels 2114, 2116, and 2118 includes a reel strip (not labeled) that includes a plurality of different symbols (not labeled) thereon in a conventional manner. It should be appreciated that the reel assembly 2110 (in this example embodiment and various other embodiments described herein) is positioned in the housing 2102 behind a see through plastic or glass panel (not shown) in a conventional manner to prevent access to the reel assembly 2110.

Figure 18:
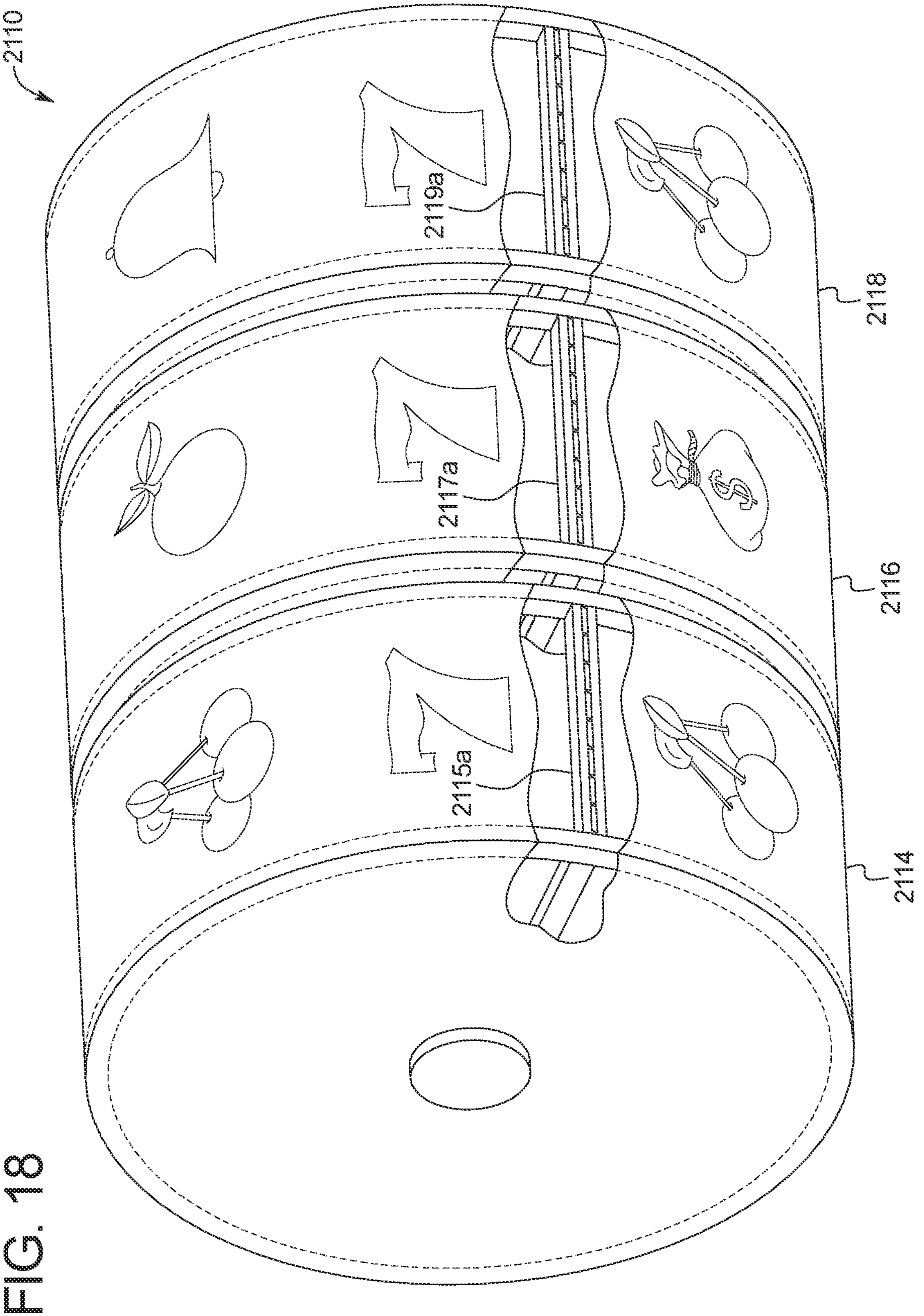
FIG. 18 is an enlarged diagrammatic perspective view of the reel assembly of FIG. 17, shown removed from the housing of the electronic gaming machine, and showing the plurality of rotatable reels with certain portions of the reel strips broken away to show certain of the supplemental image displays integrated into the plurality of rotatable reels.
Figure 19:
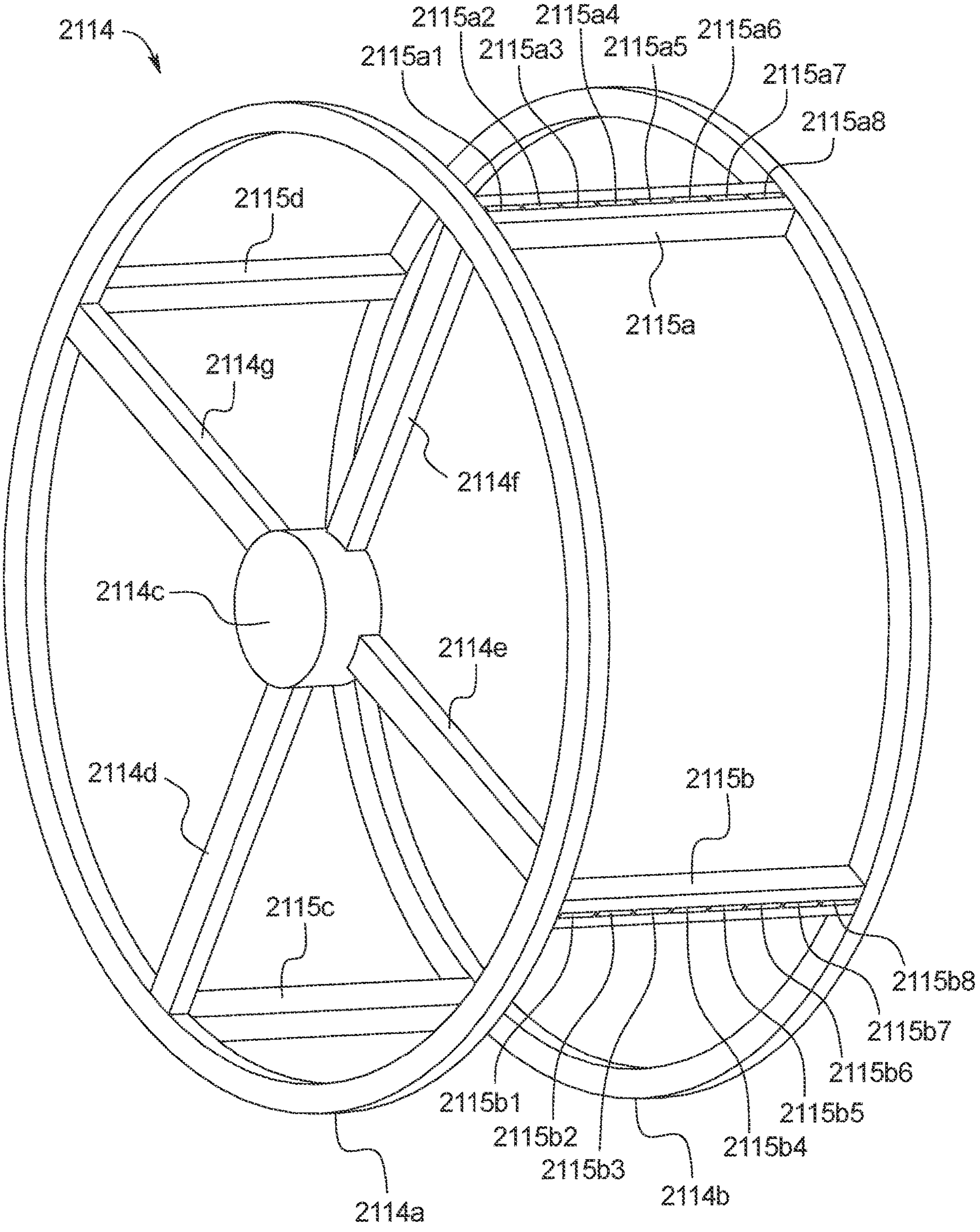
FIG. 19 is an enlarged diagrammatic exploded perspective view of the one of the rotatable reels of electronic gaming machine of FIG. 17, shown without the reel strip, and showing the supplemental image displays integrated into the basket or frame of the rotatable reel.

In this illustrated example embodiment, each supplemental image display is integrated into the basket or frame of the respective rotatable reel. Generally, as shown in FIGS. 18 and 19, the supplemental image displays are integrated into the cross bars of the baskets or frames of the respective rotatable reels 2114, 2116, and 2118. More specifically, as shown in FIG. 19, for example, the basket or frame of rotatable reel 2114 includes: (1) a first rim 2114*a*; (2) a second rim 2114*b* spaced apart from the first rim 2114*a*; (3) a central hub 2114*c*; (4) a plurality of rim-to-hub connectors 2114*d*, 2114*e*, 2114*f*, and 2114*g* that connect the central hub 2114*c* and the rim 2114*a*; and (5) a plurality of rim-to-rim connectors that connect rim 2114*a* to rim 2114*b* and that function as light arms 2115*a*, 2115*b*, 2115*c*, and 2115*d*. Each of the light arms 2115*a*, 2115*b*, 2115*c*, and 2115*d* includes a plurality of selectively illuminable lights. For example, light-arm 2115*a* includes selectively illuminable lights 2115*a*1 to 2115*a*8, and light arm 2115*b* includes selectively illuminable lights 2115*b*1 to 2115*b*8. Thus, each light arm is suitably connected to and extends transversely between the spaced apart cylindrical rims 2114*a* and 2114*b* of the basket or frame of the rotatable reel 2114. The other rotatable reels 2116 and 2118 are also configured in this manner. In this illustrated example embodiment, each first light arm includes a plurality of selectively and individually illuminable lights connected to, supported by, and positioned on a front outwardly facing side of the first light arm. Although not shown, the lights are suitably connected to a suitable electric power source. For example, the electric power for or to the individually illuminable lights can be provided by one or more wireless induction mechanisms, one or more batteries, and/or by one or more slip ring mechanisms.

Additionally, in this illustrated example embodiment each light arm of each supplemental image display of each rotatable reel is positioned substantially adjacent to the rotational path or orbit of cylindrical outer surface of the respective one of the rotatable reels 2114, 2116, and 2118 such that it can rotate in a first orbit concentrically with the cylindrical outer surface of the respective rotatable reel 2114, 2116, or 2118. For example, light arms 2115*a*, 2115*b*, 2115*c*, and 2115*d* are each configured to rotate in an orbit adjacent to the reel strip of rotatable reel 2114.

In this illustrated example embodiment, each of the separately illuminable lights (such as lights 2115*a*1 to 2115*a*8 or lights 2115*b*1 to 2115*b*8) each include one or more light emitting diodes (LEDs) that are each suitably electrically connected to a suitable light board, light control panel, or other suitable controller or control mechanism (not shown) configured to operate with a processor (not shown) of the EGM to selectively illuminate each of these lights of the light arms. In various embodiments, certain groups of these illuminable lights can be controlled or illuminated in groups in accordance with the present disclosure. In certain embodiments of the present disclosure, all of these illuminable lights are of the same color when illuminated (such as all providing a red light). In other embodiments of the present disclosure, two or more of these illuminable lights are of different colors when illuminated (such as all providing red and green lights). In other embodiments of the present disclosure, one or more of these lights are each configured to selectively provide different colors when illuminated (such as all providing red and green lights).

The separately illuminable lights are configured, arranged and positioned to selectively indicate different player perceivable images associated with the respective rotatable reels 2114, 2116, and 2118.

For example, as shown in FIG. 20, in this illustrated example embodiment, the supplemental image displays and specifically the separately illuminable lights of the light arms are configured to co-act to a display player perceivable image 2190 associated with the rotatable reels 2114, 2116, and 2118. The supplemental image display displays images that are not continuous but that co-act in this illustrated example embodiment.

It should further be appreciated that the supplemental image displays may display images that indicate any suitable image. In such embodiments, the images can be: (a) sequentially illuminated (once or more than once); or (b) simultaneously illuminated (once, more than once, or continuously for a period of time), in accordance with the present disclosure.

For example, as shown in FIG. 20, the supplemental image displays are configured to co-act to display a player perceivable image 2195 including a combination of example letters in association with the rotatable reels 2114, 2116, and 2118.

As with the above example embodiment, the lights of light arms of this example embodiment may be offset.

It should thus be appreciated that various such example embodiments of the present disclosure provide a gaming system including: a housing; a reel assembly supported by the housing, the reel assembly including a rotatable reel including a first light arm, the first light arm including a plurality of selectively illuminable first lights; a processor; and a memory device that stores a plurality of instructions, which when executed by the processor, cause the processor to: cause the reel to rotate such that the first light arm rotates in a first orbit associated with the reel, and selectively cause the first lights to illuminate while the reel and the first light arm rotate such that the first lights cause a player perceivable image to be displayed in association with the reel. In these embodiments, the light arm of a reel is configured to only rotate when that reel rotates.

It should also thus be appreciated that various such example embodiments of the present disclosure provide a gaming system including: a housing; a reel assembly supported by the housing, the reel assembly including: a rotatable first reel including a first light arm, the first light arm including a plurality of selectively illuminable first lights, the first light arm connecting spaced apart rims of the first reel; and a rotatable second reel including a second light arm, the second light arm including a plurality of selectively illuminable second lights, the second light arm connecting spaced apart rims of the second reel; a processor; and a memory device that stores a plurality of instructions, which when executed by the processor, cause the processor to: cause the first reel to rotate such that the first light arm rotates in a first orbit associated with the first reel, and cause the second reel to rotate such that the second light arm rotates in a second orbit associated with the second reel; and selectively cause the first lights and the second lights to illuminate while the first light arm rotates in the first orbit and the second light arm rotates in the second orbit such that the first lights and the second lights cause a player perceivable image to be displayed. In these embodiments, the light arm of a reel is configured to only rotate when that reel rotates.

It should further thus be appreciated that various such example embodiments of the present disclosure provide a gaming system including: a housing; a reel assembly supported by the housing, the reel assembly including: a rotatable reel supported by the frame, and a supplemental image display including a plurality of light arms integrated into the reel, the plurality of light arms each including a plurality of selectively illuminable lights; a processor; and a memory device that stores a plurality of instructions, which when executed by the processor, cause the processor to operate with the supplemental image display to: cause each of the light arms of the supplemental image display to rotate in an orbit relative to the reel, and selectively cause the lights to illuminate while the light arms rotate in the orbit to cause a player perceivable image to be displayed relative to the reel. In these embodiments, the light arm of a reel is configured to only rotate when that reel rotates.

It should be appreciated from these example embodiments that the separately supplemental image displays can be individually employed and employed in groups to indicate numerous different player perceivable images associated with the rotatable reels.

It should be appreciated from these example embodiments that the player perceivable images do not block or substantial block the view of or the player's effective view of the rotatable reels. It should be appreciated from that in other example embodiments, that the player perceivable images block part of or all of the player's effective view of the rotatable reels for reveals of the reels at designated coordinated times (such as one reel at a time).

It should be appreciated that the supplemental image displays can be additionally used for the purposes such as attract modes in accordance with the present disclosure.

It should be appreciated that the quantity of rotatable reels and the quantity of supplemental image displays may vary in accordance with the present disclosure.

It should be appreciated that the quantity, shape, size, and spacing of the rotatable reels and the quantity, shape, size, and spacing of the supplemental image displays may also vary in accordance with the present disclosure.

It should be appreciated that the quantity, shape, size, and spacing of each of the lights arm may vary in accordance with the present disclosure.

It should be appreciated that the quantity, shape, size, and spacing of each of the lights of each of the light arms may vary in accordance with the present disclosure.

It should also be appreciated that the extent to which each of the horizontally, laterally, or transversely extending light arms extends in front of, over, or relative to each of the respective reels may vary in accordance with the present disclosure.

It should be appreciated that the quantity of light arms of each of supplemental image displays may vary in accordance with the present disclosure for balance purposes. In various such embodiments, the light arms are balanced to prevent excess vibration at high speeds of rotations. In various such embodiments, the light arms are evenly spaced apart to provide such balance.

In various embodiments, as the quantity of light arms increase, the needed speed of rotation decreases.

It should also be appreciated that in various other example embodiments of the present disclosure, the reel assemblies are replaced with one or more other suitable mechanical symbol display assemblies (in place of reels) such as but not limited to: (1) dice display assemblies; (2) card display assemblies; (3) wheel display assemblies; or (4) other suitable such mechanical display assemblies.

It should also be appreciated that in various other example embodiments of the present disclosure, one or more other suitable mechanical symbol display assemblies (in addition to the reels) are employed with the supplemental image display(s) described herein such as but not limited to: (1) dice display assemblies; (2) card display assemblies; (3) wheel display assemblies; or (4) other suitable such mechanical display assemblies.

It should also be appreciated that in various other example embodiments of the present disclosure, the other suitable mechanical symbol display assemblies are replaced with one or more other suitable video symbols display devices.

It should also be appreciated that in various other example embodiments of the present disclosure, one or more of the separately illuminable lights of one or more of the supplemental image display(s) can be configure to face one or more of the reels (instead of facing outwardly from the reels) to selectively illuminate one or more of the reels. In certain such instances, one or more other lighting mechanisms for illuminating the reels can be eliminated.

It should also be appreciated that in various other example embodiments of the present disclosure, a combination of one or more of the supplemental images displays of the example embodiment of FIGS. 1 to 8, one or more of the supplemental images displays of the example embodiment of FIGS. 9 to 16, and/or one or more of the supplemental images displays of the example embodiment of FIGS. 17 to 20 may be employed in an EGM.

It should also be appreciated that the various embodiments of the present disclosure, shown in FIGS. 1 to 8, FIGS. 9 to 16, and FIGS. 17 to 20 each provide specific enhancements and improvements to EGMs, specifically including but not limited to the ability of the EGM(s) to display supplemental images integrally related to each of the reels in a new and unique manner. As described above, these supplemental images can be slightly displayed in respective rotational orbits in front of the respective reel strips, or in the same or substantially the same rotational orbit as the reel strip. These supplemental displays can be used for game player or other purposes as described above. This substantially enhances the displays of such the EGMs.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts configured to operate with one or more EGMs; and/or (b) one or more stand-alone EGMs. In other words, in various embodiments, the gaming system of the present disclosure includes: (a) one or more electronic gaming machines in combination with one or more central servers, central controllers, or remote hosts; (a) a single electronic gaming machine; or (b) a plurality of electronic gaming machines in combination with one another.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM in combination with a central server, central controller, or remote host, the central server, central controller, or remote host is any suitable computing device (such as a server) that includes at least one processor and at least one memory device or data storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM. Further, one, more than one, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM, are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client). In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. In certain embodiments in which the data network is a WAN, the gaming system includes a central server, central controller, or remote host and an EGM, each located in a different gaming establishment in a same geographic area, such as a same city or a same state. Gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet (such as the Internet) or an intranet. In certain such embodiments, an Internet browser of the EGM is usable to access an Internet game page from any location where an Internet connection is available. In one such embodiment, after the EGM accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

It should be appreciated that FIGS. 1 and 9 include example EGMs 100 and 1000, and different EGMs may be implemented using different combinations of the components described below but not shown.

In these embodiments, the EGM includes a master gaming controller configured to communicate with and to operate with a plurality of peripheral devices.

The master gaming controller includes at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface of the master gaming controller; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices (such as input/output devices); and/or (5) controlling the peripheral devices. In certain embodiments, one or more components of the master gaming controller (such as the at least one processor) reside within a housing of the EGM (described below), while in other embodiments at least one component of the master gaming controller resides outside of the housing of the EGM.

The master gaming controller also includes at least one memory device, which includes: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device resides within the housing of the EGM (described below), while in other embodiments at least one component of the at least one memory device resides outside of the housing of the EGM.

The at least one memory device is configured to store, for example: (1) configuration software, such as all the parameters and settings for a game playable on the EGM; (2) associations between configuration indicia read from an EGM with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller communicates with other devices using a serial communication protocol. A few non-limiting examples of serial communication protocols that other devices, such as peripherals (e.g., a bill validator or a ticket printer), may use to communicate with the master game controller include USB, RS-232, and Netplex (a proprietary protocol developed by IGT).

In certain embodiments, the at least one memory device is configured to store program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

The at least one memory device also stores a plurality of device drivers. Examples of different types of device drivers include device drivers for EGM components and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device can be upgraded as needed. For instance, when the at least one memory device is a hard drive, new games, new game options, new parameters, new settings for existing parameters, new settings for new parameters, new device drivers, and new communication protocols can be uploaded to the at least one memory device from the master game controller or from some other external device. As another example, when the at least one memory device includes a CD/DVD drive including a CD/DVD configured to store game options, parameters, and settings, the software stored in the at least one memory device can be upgraded by replacing a first CD/DVD with a second CD/DVD. In yet another example, when the at least one memory device uses flash memory or EPROM units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device also stores authentication and/or validation components configured to authenticate/validate specified EGM components and/or information, such as hardware components, software components, firmware components, peripheral device components, user input device components, information received from one or more user input devices, information stored in the at least one memory device, etc. Examples of various authentication and/or validation components are described in U.S. Pat. No. 6,620,047, entitled "Electronic Gaming Apparatus Having Authentication Data Sets."

In certain embodiments, the peripheral devices include several device interfaces, such as: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one player/device tracking module; and (14) at least one information filtering module.

The at least one output device includes at least one display device configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 100 illustrated in FIG. 1 includes a central display device, a player tracking display, a credit display, and a bet display.

In various embodiments, one or more of the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more keno grids, one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGM 100 illustrated in FIG. 1 includes a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGM 100 illustrated in FIG. 1 includes a plurality of speakers. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device may include any suitable device that enables an input signal to be produced and received by the at least one processor of the EGM.

In one embodiment, the at least one input device includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGM 100 illustrated in FIG. 1 includes a combined bill and ticket acceptor and a coin slot.

In one embodiment, the at least one input device includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGM 100 illustrated in FIG. 1 includes a game play activation device in the form of a game play initiation button. In other embodiments, the EGM begins game play automatically upon appropriate funding rather than upon utilization of the game play activation device.

In other embodiments, the at least one input device includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGM 100 illustrated in FIG. 1 includes a cashout device in the form of a cashout button.

In various embodiments, the at least one input device includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGM 100 illustrated in FIG. 1 includes a plurality of such buttons.

In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device includes a card reader in communication with the at least one processor of the EGM. The example EGM 100 illustrated in FIG. 1 includes a card reader. The card reader is configured to read a player identification card inserted into the card reader.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component is configured to distribute power to one or more internal components of the EGM, such as one or more rechargeable power sources (e.g., rechargeable batteries) located at the EGM.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component is configured to detect or sense one or more events and/or conditions that, for example, may result in damage to the EGM and/or that may result in loss of information associated with the EGM. Additionally, the data preservation system may be operable to initiate one or more appropriate action(s) in response to the detection of such events/conditions.

The at least one motion/gesture analysis and interpretation component is configured to analyze and/or interpret information relating to detected player movements and/or gestures to determine appropriate player input information relating to the detected player movements and/or gestures. For example, in one embodiment, the at least one motion/gesture analysis and interpretation component is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source enables the EGM to operate in a mobile environment. For example, in one embodiment, the EGM includes one or more rechargeable batteries.

The at least one geolocation module is configured to acquire geolocation information from one or more remote sources and use the acquired geolocation information to determine information relating to a relative and/or absolute position of the EGM. For example, in one implementation, the at least one geolocation module is configured to receive GPS signal information for use in determining the position or location of the EGM. In another implementation, the at least one geolocation module is configured to receive multiple wireless signals from multiple remote devices (e.g., EGMs, servers, wireless access points, etc.) and use the signal information to compute position/location information relating to the position or location of the EGM.

The at least one user identification module is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module is configured to perform filtering (e.g., based on specified criteria) of selected information to be displayed at one or more displays of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGM 100 illustrated in FIG. 1, the EGM has a support structure, housing, or cabinet that provides support for a plurality of the input devices and the output devices of the EGM. Further, the EGM is configured such that a player may operate it while standing or sitting.

In various embodiments, the EGM is positioned on a base or stand, or is configured as a pub-style tabletop game (not shown) that a player may operate typically while sitting. Different example EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled “Finite Pool Gaming Method and Apparatus”; U.S. Pat. No. 7,563,163, entitled “Gaming Device Including Outcome Pools for Providing Game Outcomes”; U.S. Pat. No. 7,833,092, entitled “Method and System for Compensating for Player Choice in a Game of Chance”; U.S. Pat. No. 8,070,579, entitled “Bingo System with Downloadable Common Patterns”; and U.S. Pat. No. 8,398,472, entitled “Central Determination Poker Game.”

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled “Using Multiple Bingo Cards to Represent Multiple Slot Paylines and Other Class III Game Options”; U.S. Pat. No. 7,731,581, entitled “Multi-Player Bingo Game with Multiple Alternative Outcome Displays”; U.S. Pat. No. 7,955,170, entitled “Providing Non-Bingo Outcomes for a Bingo Game”; U.S. Pat. No. 8,070,579, entitled “Bingo System with Downloadable Common Patterns”; and U.S. Pat. No. 8,500,538, entitled “Bingo Gaming System and Method for Providing Multiple Outcomes from Single Bingo Pattern.”

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a keno-type game, the gaming system includes one or more keno boards in either an electromechanical form or in a video form. Each keno board displays a plurality of indicia or symbols, such as numbers, letters, or other images that typically correspond to a theme associated with the gaming system.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations."

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the gaming system provides credits or other awards for one or more plays of one or more secondary games. The secondary game typically enables an award to be obtained in addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity."

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network server to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents in a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:

providing a reel assembly supported by a housing, the reel assembly comprising a rotatable reel comprising a first light arm, the first light arm comprising a plurality of selectively illuminable first lights, wherein the first light arm connects two spaced apart rims of the reel;

rotating the reel such that the first light arm rotates in a first orbit associated with the reel; and selectively illuminating the first lights while the reel and the first light arm rotate such that the first lights cause a player perceivable image to be displayed in association with the reel.

2. The method claim 1, wherein the reel further comprises a second light arm, the second light arm comprising a plurality of selectively illuminable second lights, and further comprising:

rotating the second light arm in the first orbit; and selectively illuminating the second lights while the second light arm rotates in the first orbit such that the second lights co-act with the first lights to cause the player perceivable image to be displayed.

3. The method of claim 2, wherein the first lights of the first light arm and the second lights of the second light arm are positioned at transversely offset positions relative to each other.

4. The method of claim 1, wherein the first light arm transversely extends between the two rims of the reel.

5. The method of claim 4, wherein the reel further comprises a second light arm transversely extending between the two rims of the reel, the second light arm comprising a plurality of selectively illuminable second lights configured to rotate in the first orbit such that the second lights co-act with the first lights to cause the player perceivable image to be displayed.

6. The method of claim 5, wherein the first lights of the first arm and the second lights of the second arm are positioned at transversely offset positions relative to each other.

7. The method of claim 1, wherein the first lights of the first light arm are positioned under a portion of a reel strip of the reel.

8. The method of claim 1, wherein a portion of the reel strip of the reel defines openings for the first lights of the first light arm.

9. The method of claim 1, wherein the first light arm is configured to only rotate when the reel rotates.

10. A method comprising:

providing a reel assembly supported by a housing, the reel assembly comprising:

a rotatable first reel comprising a first light arm, the first light arm comprising a plurality of selectively illuminable first lights, the first light arm connecting spaced apart rims of the first reel, and a rotatable second reel comprising a second light arm, the second light arm comprising a plurality of selectively illuminable second lights, the second light arm connecting spaced apart rims of the second reel;

rotating the first reel such that the first light arm rotates in a first orbit associated with the first reel;

rotating the second reel such that the second light arm rotates in a second orbit associated with the second reel; and selectively illuminating the first lights and the second lights while the first light arm rotates in the first orbit and the second light arm rotates in the second orbit such that the first lights and the second lights cause a player perceivable image to be displayed.

11. The method of claim 10, wherein the first reel comprises a third light arm comprising a plurality of selectively illuminable third lights.

12. The method of claim 11, wherein the first lights of the first light arm and the third lights of the third light arm of the first reel are positioned at transversely offset positions relative to each other.

13. A method comprising:

providing a reel assembly supported by a housing, the reel assembly comprising:

a frame, a rotatable reel supported by the frame, and a supplemental image display comprising a plurality of light arms integrated into the reel, the plurality of light arms each comprising a plurality of selectively illuminable lights, wherein the light arms are configured to only rotate when the reel rotates, wherein the lights of each of the light arms are positioned under spaced apart portions of a reel strip of the reel;

rotating each of the light arms of the supplemental image display in an orbit relative to the reel; and selectively illuminating the lights while the light arms rotate in the orbit to cause a player perceivable image to be displayed relative to the reel.

14. The method of claim 13, wherein each of the light arms transversely extends between two rims of the reel.

15. The method of claim 13, wherein each of the light arms connects two spaced apart rims of the reel.

16. The method of claim 13, wherein the spaced apart portions of the reel strip of the reel defines openings for the lights of each of the light arms.

17. The method of claim 13, wherein the lights of a plurality of the light arms are positioned at transversely offset positions relative to each other.

* * * * *